United States Patent
Flynn et al.

(10) Patent No.: US 8,394,553 B2
(45) Date of Patent: Mar. 12, 2013

(54) HYDROGEN ODORANTS AND ODORANT SELECTION METHOD

(75) Inventors: Patrick J. Flynn, Coatesville, PA (US); Michael Sprague, Edmonton (CA)

(73) Assignee: Enersol Inc., N.A.L.P., Fairfax, VA (US)

( * ) Notice: Subject to any disclaimer, the term of this patent is extended or adjusted under 35 U.S.C. 154(b) by 0 days.

(21) Appl. No.: 12/880,056

(22) Filed: Sep. 10, 2010

(65) Prior Publication Data

US 2011/0121237 A1 May 26, 2011

Related U.S. Application Data

(60) Continuation of application No. 12/408,117, filed on Mar. 20, 2009, now Pat. No. 7,811,688, which is a division of application No. 10/637,608, filed on Aug. 11, 2003, now abandoned.

(60) Provisional application No. 60/402,664, filed on Aug. 13, 2002.

(51) Int. Cl.
*H01M 8/00* (2006.01)
(52) U.S. Cl. ........ 429/505
(58) Field of Classification Search ............ 252/372; 429/408, 505
See application file for complete search history.

(56) References Cited

U.S. PATENT DOCUMENTS

| | | | |
|---|---|---|---|
| 1,643,954 A | 10/1927 | Prentice | |
| 4,496,639 A | 1/1985 | Rasmussen et al. | |
| 4,517,171 A | 5/1985 | Ratcliffe et al. | |
| 4,656,038 A | 4/1987 | Baugh | |
| 5,175,061 A * | 12/1992 | Hildebrandt et al. | 429/408 |
| 5,221,545 A | 6/1993 | Borschel et al. | |
| 5,492,777 A * | 2/1996 | Isenberg et al. | 429/419 |
| 5,609,845 A | 3/1997 | Cimini et al. | |
| 6,124,054 A * | 9/2000 | Gorman et al. | 429/408 |
| 6,497,855 B1 | 12/2002 | Wachs | |
| 6,699,457 B2 | 3/2004 | Cortright et al. | |
| 6,787,255 B2 * | 9/2004 | Misumi | 429/408 |
| 6,841,281 B2 * | 1/2005 | Itou et al. | 429/413 |
| 7,108,803 B1 * | 9/2006 | Mansfeld et al. | 252/372 |
| 7,182,796 B2 | 2/2007 | Kato | |
| 7,267,901 B2 | 9/2007 | Miura et al. | |
| 7,811,688 B2 * | 10/2010 | Flynn et al. | 429/437 |
| 2002/0197304 A1 | 12/2002 | Schrauzer | |
| 2003/0099593 A1 | 5/2003 | Cortright et al. | |
| 2003/0126796 A1 * | 7/2003 | Hibino et al. | 48/195 |
| 2004/0197919 A1 | 10/2004 | Herman et al. | |

FOREIGN PATENT DOCUMENTS

| | | |
|---|---|---|
| FR | 2645622 | 10/1990 |
| JP | 51-21402 | * 2/1976 |
| JP | 55-104393 | * 8/1980 |

OTHER PUBLICATIONS

Office Action issued on Dec. 20, 2005 in U.S. Appl. No. 10/637,608.
Office Action issued on Jul. 27, 2005 in U.S. Appl. No. 10/637,608.
Office Action issued on Feb. 17, 2005 in U.S. Appl. No. 10/637,608.
Office Action issued on Oct. 20, 2004 in U.S. Appl. No. 10/637,608.

* cited by examiner

*Primary Examiner* — Wayne Langel
(74) *Attorney, Agent, or Firm* — Fox Rothschild LLP; Peter J. Butch, III; Robert N. Henrie, II

(57) ABSTRACT

The present invention provides a method for evaluating the properties of hydrogen to improve the safety of hydrogen fuel, and provides a method for selecting proper odorants for hydrogen. Odorized hydrogen containing suitable odorants in appropriate concentrations with hydrogen are also provided.

11 Claims, 17 Drawing Sheets

| Odorant Name | Criterion | | | Keep as Candidate? |
|---|---|---|---|---|
| | pOI | $P^{vap}$ | Diffusion/Transport | |
| 1,2-ethanediamine | n/a | | | No |
| 1,3-propanediamine | n/a | | | No |
| 1,4-butanediamine | | | | No |
| 1,5-pentanediamine | | | | No |
| ethylselenol | | | | Yes |
| dimethylselenide | | | | Yes |
| diethylselenide | | | | Yes |
| methylamine | | | | Yes |
| dimethylamine | | | n/a | ? |
| trimethylamine | | | n/a | Yes |
| propylamine | | | | ? |
| pyridine | | n/a | n/a | No |
| ethylchloride | | n/a | | No |
| 2,3-butanedione | | | n/a | ? |
| ethyl acrylate | | | n/a | ? |

- odorant meets criterion
- odorant does not meet criterion
- not enough information n/a

FIG. 17

HYDROGEN ODORANTS AND ODORANT SELECTION METHOD

This application is a continuation of U.S. application Ser. No. 12/408,117, now U.S. Pat. No. 7,811,688, entitled "HYDROGEN ODORANTS AND ODORANT SELECTION METHOD," filed on Mar. 20, 2009, which is a divisional of U.S. application Ser. No. 10/637,608, abandoned entitled "HYDROGEN ODORANTS AND ODORANT SELECTION METHOD," filed on Aug. 11, 2003, which claims priority from U.S. Provisional Application 60/402,664 entitled "Hydrogen Odorization System and Method" filed on Aug. 13, 2002. The entire contents of all three applications are hereby incorporated by reference

BACKGROUND OF THE INVENTION

1. Field of the Invention

The present invention relates generally to a method for evaluating the properties of hydrogen to improve the safety of hydrogen fuel, and more particularly to a method of selecting a proper odorant for hydrogen.

2. Description of the Prior Art

Hydrogen is considered by many to be the fuel of the future due to its high availability, very high calorific value, wide flammability limits and non-polluting nature. However, the highly combustible nature of hydrogen poses a great hazard creating a number of problems with its safety and handling. Therefore, leak detection in hydrogen systems is critical for any hydrogen application. Pure hydrogen is a colorless and odorless gas. There are many different types of mechanical 'hydrogen gas detectors', but as with any mechanical device, these detectors are also prone to mechanical failure. Even the most durable hydrogen sensors are too costly and cumbersome for automotive use. Existing sensors are too easily jostled, and their reactive metals, which include expensive noble-metals such as palladium, are mined by contact with gases and particles that are common on the road. Considering the dangers associated with an extremely flammable gas like hydrogen, it becomes necessary to have an odorant for this fuel just as there are mercaptans for detecting natural gas leaks, accepted widely as a means of maintaining safety. The present invention alleviates safety concerns by odorizing hydrogen.

While gasoline, diesel, gasoline hybrid, and diesel hybrid vehicles are prevalent, and, electric and fuel cell vehicles are becoming more common in the transportation industry, vehicles do not currently incorporate hydrogen odorants or odorant removal systems. Some of the shortcomings and disadvantages associated with gasoline and diesel vehicles include pollution and dependency upon imported oil. Current electric vehicles, unfortunately, require a long battery charge time when not in operation. The main barrier to a widespread adoption of fuel cell vehicles is a lack of re-fueling infrastructure.

SUMMARY OF THE INVENTION

It is therefore an object of the present invention to provide a model to provide an appropriate odorant for hydrogen.

It is a further object to provide criteria for selecting a proper odorant to minimize catalyst poisoning.

Finally, it is an object of the invention to provide a method of integrating the odorized hydrogen into an existing fuel cell system.

According to a first broad aspect of the present invention, there is provided a hydrogen composition comprising: hydrogen gas; and an odorant, said odorant having a vapor pressure greater than 0.5 psi at standard conditions, having a smell detectable at less than 1 ppm by a human nose, and being in a vapor phase at detectable concentration under hydrogen storage conditions at pressures of 6000 psi.

According to a second broad aspect of the present invention, there is provided a method for detecting a hydrogen gas leak from a container comprising; providing a container containing a hydrogen composition; and detecting a leak from said container when the smell of an odorant present in said hydrogen composition is sensed, wherein said hydrogen composition comprises hydrogen and said odorant, said odorant having a vapor pressure greater than 0.5 psi, having a smell detectable at less than 1 ppm by a human nose, and being in a vapor phase at detectable concentrations under hydrogen storage conditions at pressures of 6000 psi.

According to a third broad aspect of the present invention, there is provided a method of making a hydrogen composition comprising: providing hydrogen gas; and mixing an odorant with said hydrogen gas to form said hydrogen composition, said odorant having a vapor pressure greater than 0.5 psi, having a smell detectable at less than 1 ppm by a human nose, and being in a vapor phase at detectable concentration at a pressure of 6000 psi.

Other objects and features of the present invention will be apparent from the following detailed description of the preferred embodiment.

BRIEF DESCRIPTION OF THE DRAWINGS

The invention will be described in conjunction with the accompanying drawings, in which:

FIG. 17 is an odorant selection matrix.

DETAILED DESCRIPTION OF THE PREFERRED EMBODIMENT

Figure 1:
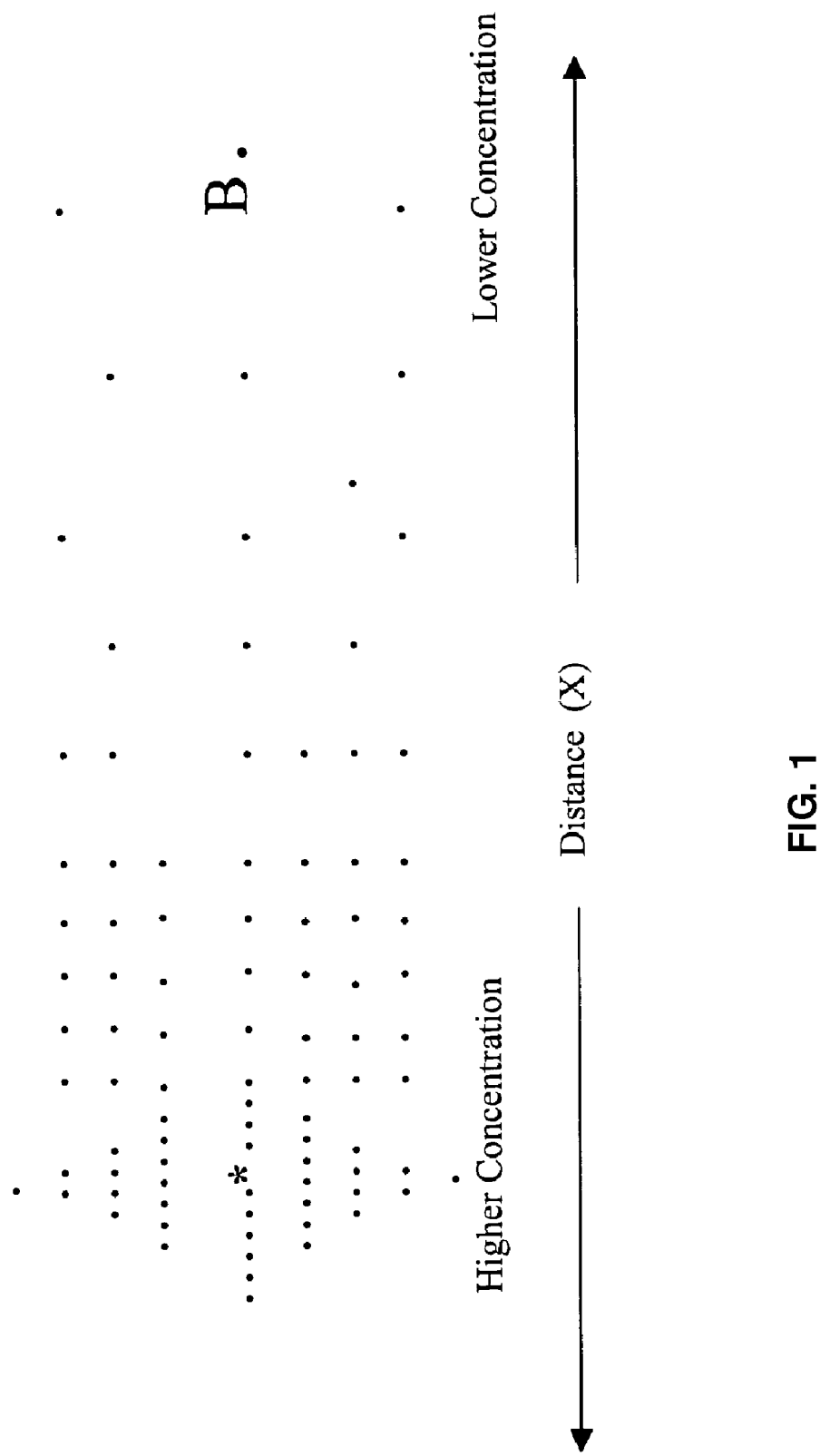
FIG. 1 is a schematic demonstrating the principle of diffusive transport.

It is advantageous to define several terms before describing the invention. It should be appreciated that the following definitions are used throughout this application.

DEFINITIONS

Where the definition of terms departs from the commonly used meaning of the term, applicant intends to utilize the definitions provided below, unless specifically indicated.

For the purposes of the present invention, the term "adsorption" refers to adhesion of molecules of a gas, liquid or dissolved substance to a surface.

For the purposes of the present invention, the term "breakthrough time" refers to the time required for the odorant adsorber to reach its capacity wherein the odorant is detected in the hydrogen effluent at the adsorber outlet.

For the purposes of the present invention the term "container" refers to any type of container that may contain hydrogen or through which hydrogen may pass, including for example a metal container, a fuel cell, a pipe, etc.

For the purposes of the present invention, the term "convection zone" refers to the volumetric space by which the leak velocity controls hydrogen transport or hydrogen composition transport.

For the purposes of the present invention, the term "detecting device" refers to any type of detecting device capable of detecting the presence of the odorants of the present invention at the concentrations at which the odorants are present in the hydrogen compositions of the present invention or are present in leaks from containers containing the hydrogen compositions of the present invention.

For the purposes of the present invention, the term "fixed bed adsorption" refers to a process whereby odorant is removed from odorized hydrogen by flowing odorized hydrogen through a stationary or "fixed" adsorbent bed.

For the purposes of the present invention, the term "flammability limits" refers to a discrete range of fuel/air mixtures whereby a flame will propagate only within this defined range. The term "lower flammability limit" refers to the leanest fuel/air mixture that will allow steady flame propagation. The term "upper flammability limit" refers to the richest fuel/air mixture that will allow steady flame propagation.

For the purposes of the present invention, the term "fluid" refers to any gas or liquid.

For the purposes of the present invention, the term "fuel cell" refers to a device that converts chemical energy directly into electrical energy.

For the purposes of the present invention, the term "hydrogen concentration front" refers to the leading edge of a hydrogen cloud as it diffuses through another fluid.

For the purposes of the present invention, the term "hydrogen reflection" refers to the reflection of hydrogen gas off of a barrier.

For the purposes of the present invention, the term "leak zone" refers to the path created by the flow of hydrogen leak through a hole.

For the purposes of the present invention, the term "observation point" refers to points within a model selected to compare and study the diffusion of hydrogen through a room or other confined space.

For the purposes of the present invention, the term "odorant" refers to a chemical compound with a smell detectable by a human nose.

For the purposes of the present invention, the term "odorant concentration front" refers to the leading edge of an odorant cloud as it diffuses through another fluid.

For the purposes of the present invention, the term "odorant loading" refers to the concentration of odorant added to hydrogen.

For the purposes of the present invention, the term "source point" refers to a point representing a hydrogen leak in a room.

For the purposes of the present invention, an odorant is considered "not harmful to humans" if exposure to an odorant is within permissible exposure limits, or within threshold limit values, or within workplace environmental exposure guidelines as set by regulatory agencies such as OSHA, NIOSH, and AIHA respectively.

DESCRIPTION

The United States safely uses about 90 billion cubic meters (3.2 trillion cubic feet) of hydrogen every year primarily for refining petroleum and for manufacturing industrial commodities, such as ammonia. In addition, chemical, metallurgical, semiconductor, fats and oils, food processing, glass, and electronic industries utilize smaller amounts of hydrogen. Comparatively little hydrogen is currently being used as a fuel or as an energy carrier. An energy infrastructure that uses hydrogen as an energy carrier—a concept called the "hydrogen economy"—is considered the most likely path toward a full commercial application of hydrogen energy technologies. The transition to a hydrogen economy is driven by the need to reduce pollution from the transportation sector that uses fossil fuels as a primary energy source. The production, distribution and utilization of fossil fuels significantly contributes to pollution problems in the U.S. and around the world.

The hydrogen fuel cell is the most promising future power source due to its high-energy efficiency and zero emission potential. Hydrogen's potential use in fuel and energy applications includes powering vehicles, running turbines or fuel cells to produce electricity, and generating heat and electricity for buildings. The use of hydrogen as a fuel and energy carrier will require an infrastructure for safe and cost-effective hydrogen transport and storage. Some automobile manufacturers have developed hydrogen-powered vehicles, however the market for these vehicles is limited by the lack of hydrogen infrastructure. Commercial application of hydrogen fuel cells in the automotive industry will be an important driver of the hydrogen economy.

Currently, NASA's space program is a primary example of hydrogen's use as a fuel. Liquid hydrogen has propelled the space shuttle and other rockets since the 1970's. The Challenger space shuttle accident has been a reminder of the safety risks involved when hydrogen is used as fuel. Aside from classical disasters such as the Challenger accident, hydrogen has an excellent safety record and is as safe for transport, storage and use as many other fuels. Nevertheless, safety remains a top priority in all aspects of hydrogen energy. The Department of Energy's Hydrogen Energy program delivers an expectation that hydrogen will become a major energy source derived from renewable resources. The present invention integrates hydrogen odorization and onboard vehicle odorant adsorption into a fuel cell system. While this invention is presented for consideration in transportation, it is understood that the design may also be modified for stationary fuel cell systems. This design is unique as it develops hydrogen odorization as a safety consideration.

At fueling stations today, hydrogen dispensers are capable of transferring hydrogen to fuel cell vehicles at pressures up to 6,000 psi at ambient temperature. Hydrogen storage and dispensing infrastructure is a key safety concern due to the dangers of a high-pressure hydrogen leak combined with hydrogen's explosive nature at and around a fueling station. Having odorized hydrogen available at fueling stations will increase the safety of handling hydrogen. In terms of on-board vehicle storage, a majority of fuel cell vehicles in operation today utilize compressed gas storage tanks. Enhancing the safety of compressed hydrogen cylinders is also a critical need. Odorized hydrogen would enhance the safety of compressed hydrogen cylinders, given a slow or pinhole leak scenario. Other technologies that store hydrogen on-board in solid-state are under investigation (metal hydrides, carbon nanotubes, and glass microspheres) and are inherently safer than compressed or liquid storage of hydrogen. However, with any type of on-board storage device the issue remains with maintaining safety at hydrogen filling stations. Odorized hydrogen will undoubtedly improve safety at filling stations.

Hydrogen fuel cells use platinum to electrochemically oxidize hydrogen at the anode of the cell. If the platinum's active sites are occupied by a molecule other than hydrogen, the activity of the catalyst, and hence the efficiency and performance of the fuel cell, dramatically decreases. This is referred to as "poisoning of the catalyst". Similarly, on-board solid-state storage devices, such as metal hydrides, carbon nanotubes, or glass microspheres may be "poisoned". Any odorant chosen for hydrogen should not poison the storage material, nor should the odorant inhibit fuel cell performance or poison the fuel cell catalyst. If the odorant is found to affect fuel cell catalyst performance, or performance of a solid-state storage device, the odorant should be removed from hydrogen before entering the device. In a hydrogen fuel cell application, the odorant may be removed by a fixed bed adsorption system.

Hydrogen odorization focuses on the development of an odorant and a viable method of odorization that is compatible with hydrogen fuel systems without interfering with the components and energy conversion efficiency of the system. A suitable odorant needs to have a unique odor and must be non-toxic to both human beings and the environment at the required concentration.

Hydrogen, like natural gas, faces similar industrial problems in its application, such as storage, transmission and distribution. In order to protect public welfare and safety, hydrogen needs to be odorized before its large-scale application/utilization by the general public. Natural gas has a set of mature and effective odorization systems for its application, governed by specific federal regulations; however, there are currently no special regulations governing the odorization of hydrogen. Current regulations regarding the safe use, transportation and storage of natural gas are necessary to understand constraints and limitations in choosing a suitable odorant for the hydrogen economy. The codes and standards developed to date have been implemented due to special safety concerns related to the storage, transmission and distribution of natural gas. Mixtures of hydrogen and odorant, therefore, should also comply with current regulations for natural gas odorants. International standards drafted by the International Standards Organization for Hydrogen Technologies (ISO/TC 197) with respect to gaseous hydrogen applications in the transportation sector will provide regulations for storage tanks, filling stations, vehicles and pump connectors, as well as hydrogen product specifications. These draft regulations help gain an understanding of compatibility issues that may arise as a result of adding an odorant. The Department of Transportation (DOT) and Occupational Safety and Health Administration (OSHA) have jurisdiction over domestic hydrogen regulations.

To odorize flammable gas, compatible odorants must be carefully selected. Compounds meeting specific criteria may be chosen with consideration for economic factors such as technical feasibility and production cost. An odorant favorable for this purpose should have low solubility in water, good oxidative stability, a minimum defined odor threshold, a minimum defined vapor pressure, and a minimum defined diffusivity. Additionally toxicity, combustibility and other properties of combustion products should be considered. If a single component cannot satisfy all the requirements, blends of two or more components may be used.

Physical and chemical properties of hydrogen that are important to the development of a proper hydrogen odorant include:

| | |
|---|---|
| Lower Flammability Limit (% by volume/air): | 4.0 |
| Lower Detonation Limit (% by volume/air): | 18.3 |
| Stoichiometric Mixture (% by volume/air): | 29.6 |
| Upper Flammability Limit (% by volume/air): | 75.0 |
| Upper Detonation Limit (% by volume/air): | 59.0 |
| Minimum Ignition Energy (mJ): | 0.017 |
| Auto-Ignition Temperature (° C.): | 520° |
| Density @ Standard T/P ($Kg/m^3$): | 0.0827 |
| Viscosity @ Standard TIP ($10^{-6}$ Pa * s): | 8.814 |
| Diffusion Coefficient in Air ($cm^2/s$): | 0.76 |

Hydrogen has a very low density enabling it to readily disperse and mix with air to create explosion or ignition hazards. A hydrogen molecule is very small and has a high diffusion coefficient both in other gases and in solids. When considering hydrogen leaks, its high buoyancy generally affects gas motion considerably more than its high diffusivity. However, the diffusive and dispersive characteristics limit any explosion or ignition hazards in a well-ventilated area. The low viscosity of hydrogen, and its respective flow rate, enhances the hazard of leaks through porous materials, fittings, and seals (i.e. hydrogen has a flow rate approximately 25% higher than methane through the same leak with the same associated pressure drop). Density, diffusivity, and viscosity characteristics should be taken into consideration to select materials used for hydrogen storage devices and to consider compatibility with a suitable odorant.

Characteristically, a higher diffusivity coefficient describes a compound with a lower molecular weight. A compound's diffusivity is dependent upon molecular weight and temperature, rather than the concentration. However, the rate of molecular diffusive transport of a compound is determined from its diffusion coefficient and the concentration gradient of the gaseous compound in an environment and thereby the process of molecular diffusion. As the concentration of a compound within an environment increases so does the frequency of molecular collision thus increasing the rate of mixing. Referring to FIG. 1, if point * is the source of gaseous release, then higher concentration lies around that point * during a leak event than at any distance away from that point *. Therefore, so long as the distance, x, increases, the concentration of molecules decreases and the magnitude if molecular diffusion (diffusive mixing) decreases. Brownian motion describes the behavior wherein the concentration gradient between any distance, x, and reference point decreases, resulting in slower mixing (lower collision frequency). Hydrogen has its own diffusion coefficient (0.76 cm$^2$/s) by which the magnitude of mixing decreases with distance at a constant rate governed by the change in concentration. Therefore, a longer time is necessary to reach a flammable concentration of $H_2$ at 4% as distance, x, increases away from the source.

The minimum ignition energy of hydrogen is very low. Since most ignition sources generate more than 10 mJ of energy, most fuels would ignite if the fuel/air ratio reaches the lower flammability limit. Therefore, the minimum ignition energy, the lower flammability, and detonation limits are important characteristics when selecting a suitable odorant.

Another important property of an odorant is its odor threshold. A suitable odorant should be detectable by the human nose at very low concentrations. In fact, the odor should be detected as soon as hydrogen begins to leak. In order for a compound to be considered as a suitable odorant, it should have a low odor threshold in the gas phase. This factor is important because the odorant will be present as a gas along with hydrogen in the event of a leak. A critical issue in hydrogen odorization is phase compatibility between hydrogen and the odorant at high pressure. To ensure simultaneous outflow in case of a leak, both components should be in the same phase and well blended. Some odor threshold values may be found in the Handbook of Hazardous Chemical Properties. In addition, the American Industrial Hygiene Association (AIHA) publishes a book of odor threshold values (Odor Thresholds for Chemicals with Established Occupational Health Standards).

Physical properties, chemical properties, health hazard information, and odor threshold may be considered when developing the criterion basis for selecting hydrogen odorants. A vast myriad of organic compounds exist that may potentially be used as odorants for hydrogen fuel. The possible compounds have variable odor potency, odor threshold values, toxicity, and physical properties. Certain functional groups, such as the mercaptans, have high potency odors. According to published standardized human olfactory thresholds, mercaptans are among the strongest smelling compounds known. The stench of mercaptans is a key reason why these compounds were chosen for natural gas odorization. The following is a list of functional groups that may be used to highlight key factors for olfactory thresholds in humans. Standard olfactory power refers to the minimum concentration at which a particular compound is detectable by the average person. The mathematical definition is given as the negative log of odorant concentration expressed in volumetric fraction: pOI=−log [odorant]. Based on this definition an olfactory power of "0/6/9" corresponds to "odorlessness/1ppm/1ppb" threshold levels, respectively. In air, a compound with a greater olfactory power may be detected at lower concentration levels.

TABLE 1

Functionality and Odor Potency of Low Molecular Weight Compounds

| Functionality | Compound | Olfactory Power (pOI) |
|---|---|---|
| hydrocarbons | ethane | 2.00 |
| | propane | 2.57 |
| | butane | 3.69 |
| halides | chloromethane | 4.99 |
| | ethylchloride | 5.39 |
| alcohols | methanol | 3.85 |
| | ethanol | 4.54 |
| | 1-propanol | 5.62 |
| esters | methyl formate | 4.03 |
| | methyl acetate | 5.21 |
| ketones | acetone | 4.84 |
| aldehydes | formaldehyde | 6.06 |
| | acetaldehyde | 6.73 |
| amines | methylamine | 7.73 |
| | dimethylamine | 7.09 |
| | ethylamine | 6.49 |
| | diethylamine | 6.73 |
| | propylamine | 7.96 |
| thiols (mercaptans) | methyl mercaptan | 8.98 |
| | ethyl mercaptan | 8.97 |
| | isobutyl mercaptan | 8.95 |
| | t-butyl mercaptan | 9.48 |
| sulfides | dimethylsulfide | 8.65 |
| | methylethylsulfide | 8.42 |
| | diethylsulfide | 8.41 |
| selenides | diethylselenide | 9.13 |
| selenols | ethylselenol | 10.74 |

Figure 2:
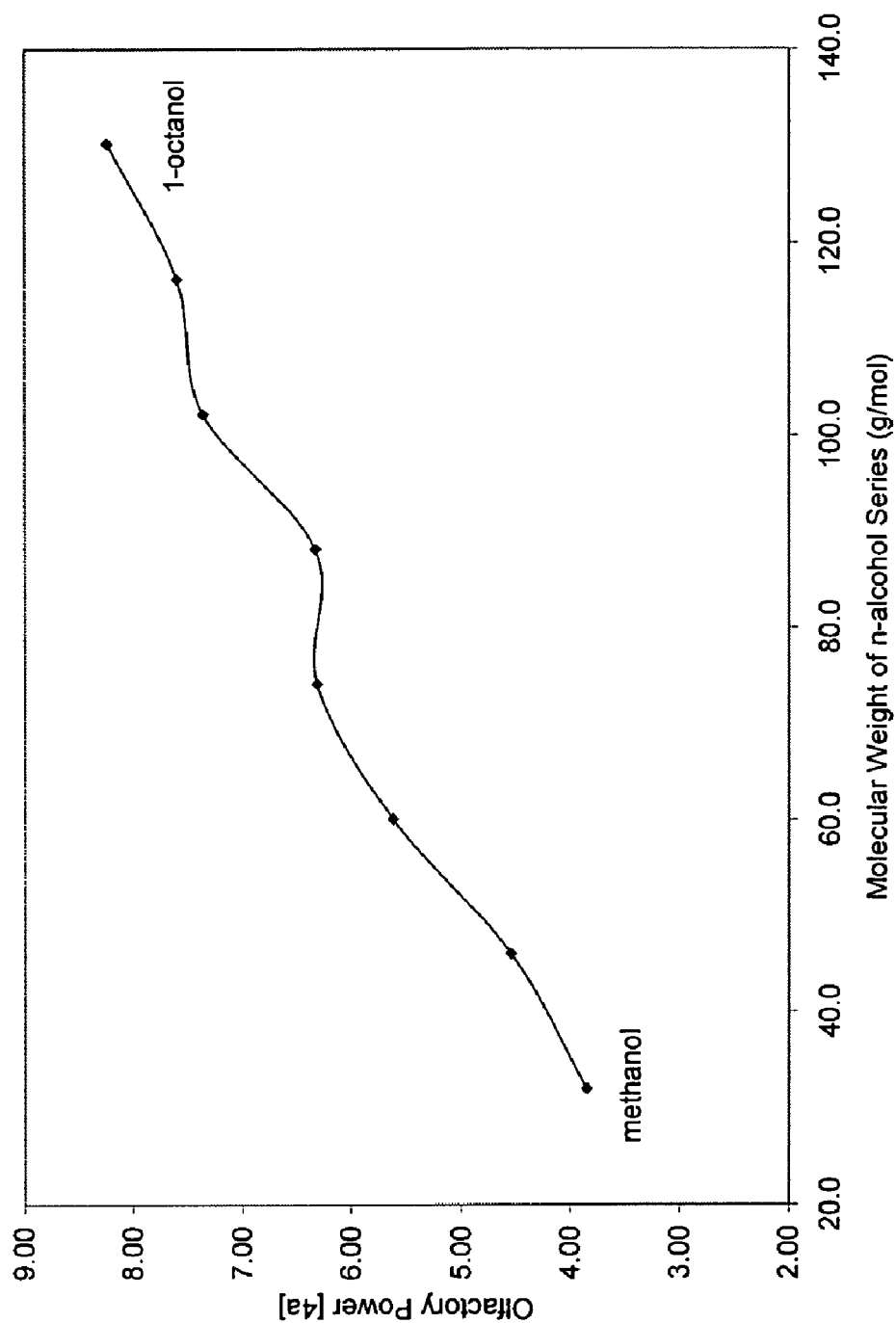
FIG. 2 is a graph illustrating olfactory power of n-alcohols.
Figure 3:
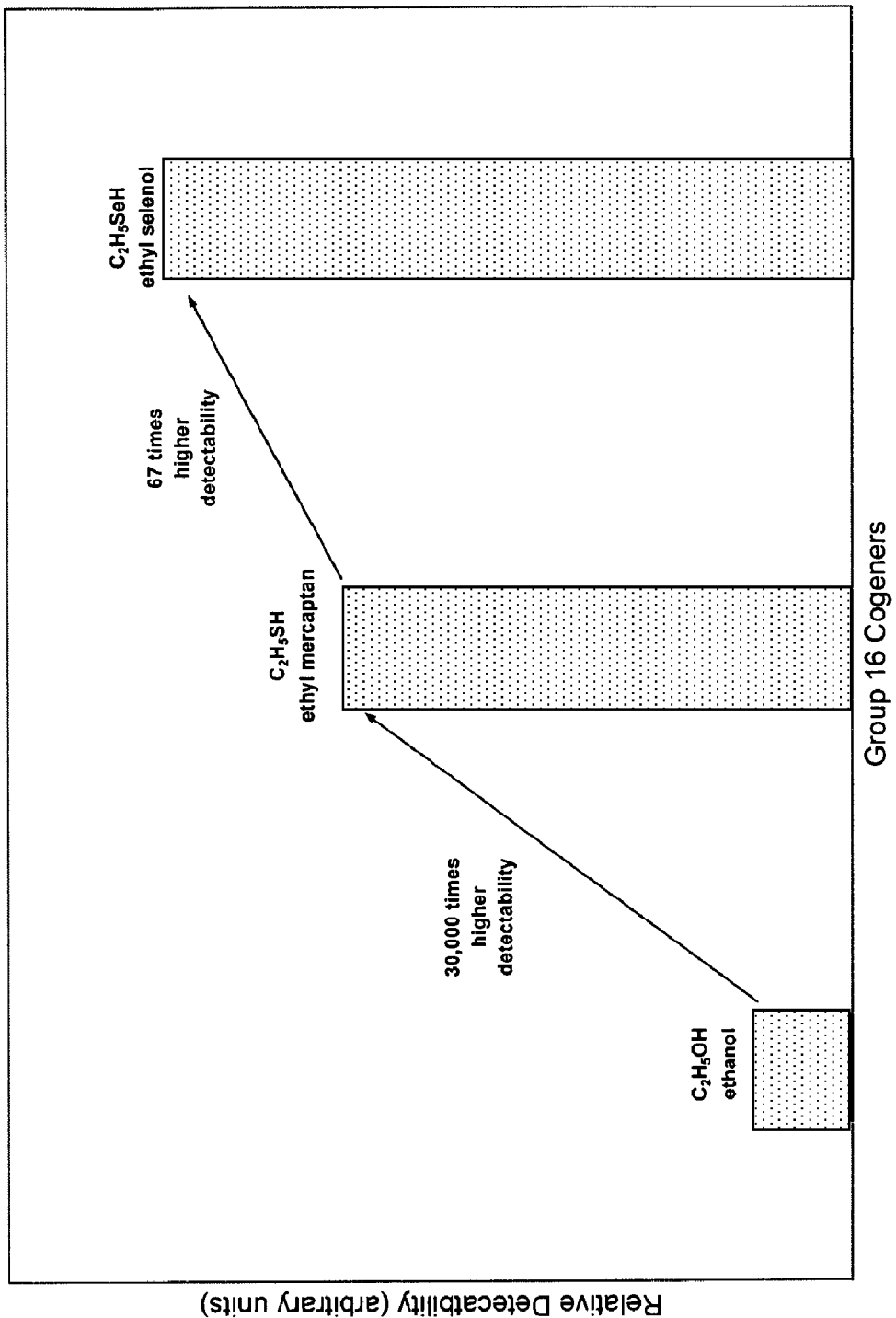
FIG. 3 is a chart of the relative detectability of Group 16 cogeners.

From Table 1 and based on the definition of olfactory power, the above sulfur compounds are detectable at levels of parts-per-billion (Ppb). In terms of olfactory power, most other functional groups are not as potent. The amines are also potent and detectable at sub-parts-per-million levels and notably, compounds containing selenium are the most potent. Other functional groups considered include: tellurides, phosphines, boranes, nitroso compounds, nitro compounds, enamines, sulfoxides, sulfones and imines. An important trend extracted from this data set is that, in general, as molecular weight (and lipid solubility) increases within one functionality (i.e. a homologous series), olfactory power also increases. This is illustrated in FIG. 2, which shows the olfactory power of a homologous series of n-alcohols. Another important trend is extracted from FIG. 3, where the olfactory power of Group 16 cogeners (oxygen vs. sulfur vs. selenium) are plotted for ethanol, ethyl mercaptan, and ethyl selenol. It may be seen from FIG. 3 that ethyl mercaptan has 30,000 times higher detectability as compared to ethanol, and furthermore, ethyl selenol has 67 times higher detectability as compared to ethyl mercaptan. Thus, the trend when going from oxygen to sulfur to selenium (down a periodic Group), is an increase in olfactory power. Ethyl selenol is therefore a better odorant candidate as compared to sulfur or oxygen cogeners. The trend, whereby olfactory power increases with molecular weight, is important when selecting an appropriate odorant for hydrogen. The importance of olfactory power is illustrated when considering issues such as odorant vapor-liquid equilibrium at high pressure and odorant dispersion and diffusion characteristics relative to hydrogen. In terms of odorant vapor-liquid equilibrium, the odorant should have an appropriate vapor pressure, such the odorant remains in the vapor phase at detectable concentrations under high pressures. Generally, smaller organic compounds have higher vapor pressure. Both olfactory power and vapor pressure may be correlated to determine whether an odorant remains in the vapor phase at detectable concentrations at high pressure. In terms of odorant dispersion and diffusion, the odorant should be capable of fast diffusion in order to provide ample time for human sensory detection, before hydrogen reaches explosive or flammability limits. In general, to meet diffusion and dispersion requirements, an odorant should be a small compound. It becomes apparent that there is a need for small organic compounds with high olfactory power to meet odorant vapor-liquid equilibrium and odorant dispersion and diffusion requirements of the system. Despite the aforementioned needs for small odorant compounds, large organic compounds generally have a higher olfactory power. Therefore, the odorant selection criteria should emphasize selection of an odorant based on its small molecular size and high olfactory power.

A useful class of compounds for the odorization of hydrogen is organoselenium compounds. Like their organosulfur cogeners, organoselenium compounds pack significant stench power. In most cases, the olfactory power of organoselenium compounds even exceeds that of structurally similar organosulfur compounds. The stench of organoselenium compounds has been described as even more putrid and penetrating as compared to organosulfur compounds. Organoselenium compounds may be reactive under oxidative conditions. Selenols tend to react with each other in the presence of oxygen to form diselenides given in the following formula:

$$2R\text{---}SeH + O_2 \rightarrow R\text{---}Se\text{---}Se\text{---}R + H_2O$$

Although auto-oxidation may occur, the reaction is slow at ambient conditions. Autooxidation should not be a major concern since the resultant diselenide retains a potent stench.

Other factors to consider with organoselenium compounds are cost and availability, as well as environmental and health hazards. Selenium is an essential element for normal human biological development and is found in elemental form in daily vitamin supplements. Selenium is also an important component of antioxidant enzymes that protect cells against the effects of free radicals that are produced during normal oxygen metabolism. Furthermore, selenium is essential for normal functioning of the immune system and thyroid gland. At larger doses, however, selenium is known to cause a medical condition called selenosis. Selenosis occurs when selenium is ingested in quantities of 5 mg/day for the average weight person. If a catastrophic leak occurred from a hydrogen storage tank containing 10 kg of hydrogen loaded with 30 ppm ethylselenol, the total release of selenium would be 0.22 g of selenium. This amount of selenium would not be expected to cause a health hazard. The cost of selenium is $0.65/g and is available in commercial quantities. Therefore, a selenol odorant loaded at 30 ppm into 10 kg hydrogen would add $0.14 to the cost of the hydrogen.

As stated above, it is crucial to understand the compatibility of hydrogen and an odorant. Therefore, examination of how an odorant reacts to hydrogen's storage conditions is necessary. At low concentrations an odorant must remain in the vapor phase at detectable concentrations under high-pressure hydrogen storage conditions. To quantitatively validate the concentration of an odorant in the gas phase at high pressure, first order phase equilibrium equations may be used.

When setting up the system, it is assumed that only two components exist, hydrogen (H2) and an odorant (A). It is also assumed that the odorant is saturated. This means that at the constant pressure when odorant is added, the amount of odorant in the vapor phase remains constant. The equation used to find the fraction of the vapor phase taken solely by the odorant is Raoult's Law:

$$x_A P_A^{sat} = \gamma_A P$$

Where, $x_A$ is the odorant's fraction of the liquid phase, $\gamma_A$ is the odorant's fraction of the vapor phase, $P_A^{sat}$ is the vapor pressure of the saturated odorant, and P is the total pressure within the system. It takes extreme pressures on the order of 150,000 psi to condense hydrogen at room temperature. From this knowledge it is assumed that no hydrogen will exist in the liquid phase, therefore $x_A$ will equal one:

$$x_A = 1$$

And the equation for $\gamma_A$ becomes:

$$\gamma_A = \frac{P_A^{sat}}{P}$$

With these values, the concentration of odorant may be found at ambient conditions for the storage conditions of 6,000 psi. To calculate the pressure needed to produce a certain saturated concentration of odorant in the vapor phase:

$$P = \frac{P_A^{sat}}{\gamma_A}$$

Where, $$\gamma_A = \frac{[\text{odorant (ppm)}]}{1 \times 10^6}$$

The phase calculations for possible odorants are listed below in Table 2.

TABLE 2

| Odorant | Odorant Vapor Pressure $P_A^{SAT}$ (psi @ 25° C.) | Saturated Odorant Concentration $y_A$ (ppm @ 6000 psi, 25° C.) |
|---|---|---|
| pyridine | 0.4 | 67 |
| t-butyl mercaptan | 3.5 | 583 |
| ethyl mercaptan | 10.2 | 1705 |
| dimethyl selenide | 4.6 | 773 |
| ethyl selenol* | ~5 | ~833 |
| propyl amine | 6.0 | 999 |
| dimethyl amine | 29.4 | 4892 |
| trimethyl amine | 31.0 | 5172 |

*estimated value based on known vapor pressures of structurally similar compounds T-butyl mercaptan and ethyl mercaptan are used for comparison Since these compounds are common odorants for natural gas. From this analysis, it is noted that odorants such as t-butyl mercaptan are present in the vapor phase at 6000 psi up to a maximum concentration of approximately 580 ppm. For compounds with low vapor pressures, there becomes a limit to the amount of odorant present in the gas phase at high pressure. For example, pyridine will be present in the gas phase at 6000 psi at a maximum concentration of only 67 ppm. It should be recognized that at high pressures, vapor-liquid equilibrium deviate from linearity and therefore, this first order equation should be used conservatively. For the odorant criteria, conservatively stated, a suitable odorant may have a vapor pressure greater than 0.5 psi.

Olfactory power provides an additional basis on which to narrow the possibilities of potential odorants. Based on saturated odorant vapor phase concentration at high pressure, there is a minimum olfactory power required of an odorant. Olfactory power first determines odorant loading in the fuel, and odorant loading is further affected by phase equilibrium during fuel storage at high pressure. In regard to phase equilibrium, the odorant may remain in the vapor phase at 6000 psi only at equilibrium limited vapor saturation. Phase calculations therefore show the maximum vapor phase odorant concentration at high pressure. If a low potency odorant is used, like ethanol for example, it is necessary for it to be added to the fuel at very high loadings in order to be detectable. A low potency odorant loaded at high concentration may not satisfy the phase equilibrium requirements of the system. Thus, odorant loading is determined by both olfactory power and phase equilibrium, which may ultimately exclude a potential odorant as a possibility.

There is a minimum olfactory power and minimum vapor pressure requirement of the odorant itself. As a basis for proper odorant loading, examine the natural gas case. The Gas Research Institute has published results on the variability of natural gas composition in metropolitan areas. In this report, it is stated that mercaptans are added to natural gas in varying amounts, ranging from 8 to 30 ppm, even though most mercaptans are easily detectable at sub-ppm levels. Furthermore, Japanese regulations state that odorants should be loaded in natural gas at 1000× the threshold detectability of an odorant. The "overloading" of odorant is due to variable human olfactory response and odorant condensation in pipes. In the survey performed by The Gas Research Institute, the average mercaptan loading in the U.S. is approximately two orders of magnitude above the mercaptan threshold of detectability. Assuming the concentration ratio (odorant loading to odorant threshold) is approximately the same for the natural gas system and the hydrogen system, loading requirements of different odorants with varying olfactory thresholds may be calculated. This data may then be further used to eliminate odorants with low olfactory thresholds, based on odorant-hydrogen phase equilibrium. The loading factor from Table 3 may be then used to calculate the maximum loading of odorants for the odorization of hydrogen, shown in Table 4. The saturated vapor phase concentration is then calculated for each of the odorants stored in hydrogen at 6000 psi. In Table 4, columns 'A' and 'B' show that ethanol could perform as an effective odorant if loaded at 2884 ppm; however, ethanol would be in the vapor phase at concentrations no greater than 190 ppm at 6000 psi. Thus, ethanol may be eliminated as an odorant as it is does not provide the olfactory power needed to meet saturated vapor phase concentrations. Generally, if values in column A are greater than the values in column B (A>B), then the odorant may be ruled out as a possibility. The situation described above may be generalized for all odorants given their vapor pressure and olfactory power.

TABLE 3

Odorant Loading Requirements in Natural Gas

| Odorant | Olfactory Power (p.ol) | Odorant Threshold (ppm)[a] | Minimum Odorant Loading Required to Detect $H_2$ at 1/5 LFL (ppm)[b] | Maximum Odorant Loading in NG (ppm)[c] | Loading Factor[d] |
|---|---|---|---|---|---|
| ethyl mercaptan | 8.97 | 0.00107 | 0.107 | 30 | 280 |

[a]Minimum detection concentration or odorant threshold (ppm) = $10^{(odorant\ concentration)} \times 10^6$

[b]Odorant threshold in hydrogen at 1/5 the LFL (1/5 LFL = 1 vol. % $H^2$ in air).

[c]Liss, W. E. et al., Variability of Natural Gas Composition in Select Major Metropolitan Areas of the US, Gas Research Institute Report, Contract #5091-293-2132, 1992.

[d]Loading factor = maximum loading in NG/minimum loading required for detectability.

TABLE 4

Sample Odorant Loading Requirements for Hydrogen

| Odorant | Olfactory Power (p.ol) | Odorant Threshold (ppm)[a] | Minimum Odorant Loading Required to Detect $H_2$ at 1/5 LFL[b] (ppm) | 'A' Required Odorant Loading in Hydrogen (ppm)[e] | 'B' Saturated Odorant Loading [6000 psi $H_2$] (ppm)[f] |
|---|---|---|---|---|---|
| ethyl | 4.54 | 28.840 | 2884.03 | 807,529 | 190 |
| pyridine | 7.07 | 0.08511 | 8.5114 | 2,383 | 67 |
| ethyl chloride | 5.39 | 4.074 | 407.38 | 114,066 | 3256 |
| ethyl mercaptan | 8.97 | 0.001072 | 0.1072 | 30 | 1705 |
| ethyl selenol | 10.74 | 0.000018 | 0.0018 | 0.5 | 833 |
| propyl amine | 7.96 | 0.010965 | 1.0965 | 307 | 999 |
| dimethyl amine | 7.09 | 0.081283 | 8.1283 | 2,276 | 4892 |
| methyl amine | 7.73 | 0.018621 | 1.8621 | 521 | 8543 |

[e]Required loading in $H_2$ = loading factor (280) * minimum odorant loading required

[f]Saturated odorant loading at 6000 psi = $P_A^{sat}/P \times 10^6$

Figure 4:
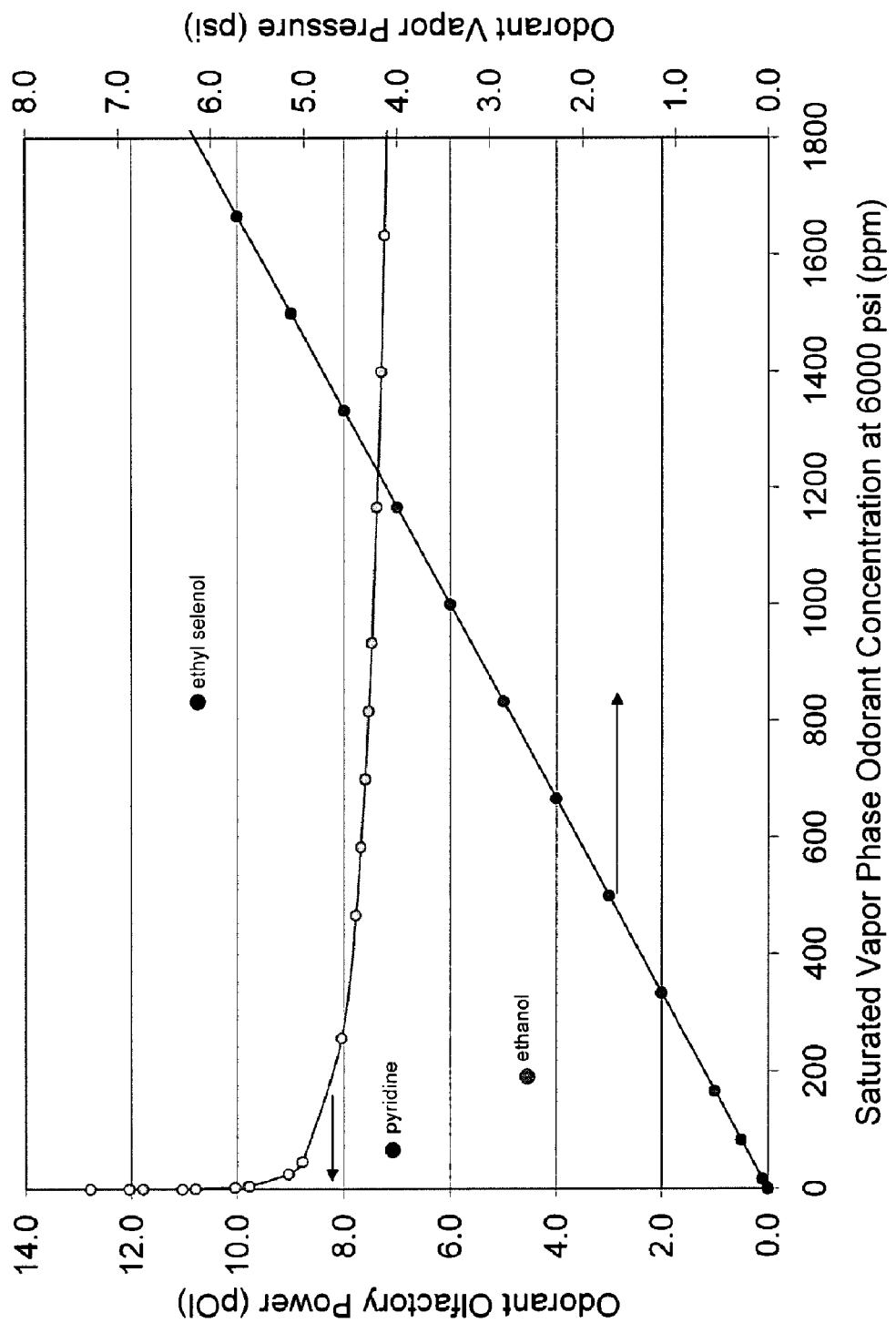
FIG. 4 is a chart of the vapor pressure-olfactory power relationship generalized for all odorants.

Based on odorant saturation vapor pressures, a minimum effective olfactory power of an odorant may be determined. FIG. 4 shows the relationship between olfactory power and vapor pressure of an odorant. As the olfactory power decreases from 10 to 4, the detectable concentration ranges from a few ppm required for detectability to several thousand ppm required for detectability. The detectable limit may then be correlated to find the minimum vapor pressure required for a particular odorant. From the olfactory power curve, of FIG. 4, an asymptote occurs at olfactory power approximately equal to 7. Therefore, this is the minimum olfactory power required for an acceptable odorant. When odorant properties are plotted on this graph and saturated vapor phase concentration at 6000 psi ($y_A$) is calculated from vapor pressure using Raoult's Law, any odorants that fall below the olfactory power curve are excluded from further consideration. Any odorants remaining above the olfactory power curve may remain as possible odorant candidates. This mathematical correlation allows selection or rejection of odorants based on olfactory power, vapor pressure, and saturated vapor phase concentration.

Hydrogen utilization is a greater safety risk in confined area conditions where there is potential for leaking hydrogen to collect in pockets. Because of its very small molecular size and weight, low density, and high diffusivity, hydrogen readily disperses and rapidly mixes in air. This unique behavior presents additional concerns when utilizing, transporting, and storing hydrogen in or near a confined space. However, relative to natural gas, or other flammable gases, hydrogen may not pose the same safety concerns in an open-air environment, where natural gas and propane are more dense fuels that tend to collect near the ground. During a leak event hydrogen disperses into the atmosphere very rapidly without the potential of collecting into a flammable concentration.

Substance releases are classified into wide and limited aperture releases. In a wide aperture case, a large hole develops, for example by over-pressurizing and explosion of a storage tank, and releases a substantial amount of hydrogen in a very short amount of time. In limited aperture scenarios, material is released at a slow rate and upstream conditions are not immediately affected. Limited aperture releases have multiple sources like holes, cracks in tanks and pipes, leaks in flanges, valves, and pumps, and severed or ruptured pipes.

During a leak event hydrogen may leak from a small crack, hole, or severed pipe into a space with an initial velocity that quickly decays with time until it reaches a value of zero. The leaking process reaches steady state in a short time. Leak velocity, pressure dissipation, temperature, convective eddies, and diffusion properties control dispersion throughout the space. To ensure the highest order of safety for the public, hydrogen dispersion and diffusion needs to be understood. Hydrogen's very low flammability and detonation limits, coupled with its dispersion characteristics, present a very dangerous combination if hydrogen utilization systems are not properly designed. Hydrogen transport is an important element for the development and improvement of hydrogen fueled systems. However, the transport behavior of hydrogen relative to the behavior of an odorant is equally important when selecting an effective hydrogen odorant.

The present invention includes a three-dimensional diffusion model developed to describe hydrogen and odorant transport during a leak event. Hydrogen is the most diffusive molecule in air, so if the loaded odorant may prove to be effective during a leak event by enabling sensory detection in a diffusion limited environment, prior to hydrogen accumulating to a flammable or explosive mixture, odorant detection during a convective dominant or a convective-diffusive mixing event is certain.

The basis for the model is the general form of the advection/diffusion equation for the transport of substances through an environment:

$$\underbrace{\frac{\partial C}{\partial t}}_{\text{Change of Conc. Within an environment}} = \underbrace{\left[ D_x \frac{\partial^2 C}{\partial x^2} + D_y \frac{\partial^2 C}{\partial y^2} + D_z \frac{\partial^2 C}{\partial z^2} \right]}_{\text{Diffusive Terms}} - \underbrace{\left[ V_x \frac{\partial C}{\partial x} + V_y \frac{\partial C}{\partial y} + V_z \frac{\partial C}{\partial z} \right]}_{\text{Convective or Advective Terms}} - \underbrace{\lambda C}_{\text{Mass Generation (adsorption/desorption)}}$$

Where at ($\partial C/\partial t$) ultimately describes the concentration change of hydrogen within a confined space as time passes. ($D_i \partial^2 C/\partial i^2$) denotes the diffusive/dispersive phenomena as the concentration of hydrogen mixes with air in the lateral and transverse directions both through molecular and mechanical effects. ($V_i \partial C/\partial i$) describes the advection of hydrogen as it moves and mixes with air. ($\lambda C$) describes the mass generation of hydrogen as it adsorbs to surfaces throughout the space.

A three-dimensional numerical diffusive model was developed to simulate hydrogen leaking from a point source within a confined space. The simulation also takes into account no mass generation.

The resulting general equation is as follows:

$$\frac{\partial C}{\partial t} = \left[ D_x \frac{\partial^2 C}{\partial x^2} + D_y \frac{\partial^2 C}{\partial y^2} + D_z \frac{\partial^2 C}{\partial z^2} \right]$$

The Forward-Time-Central-Space explicit scheme utilized is as follows:

$$\frac{C_i^{n+1} - C_i^n}{\Delta t} = \alpha \left[ \frac{C_{i+1}^n - 2C_i^n + C_{i-1}^n}{(\Delta x)^2} \right]$$

Figure 5:
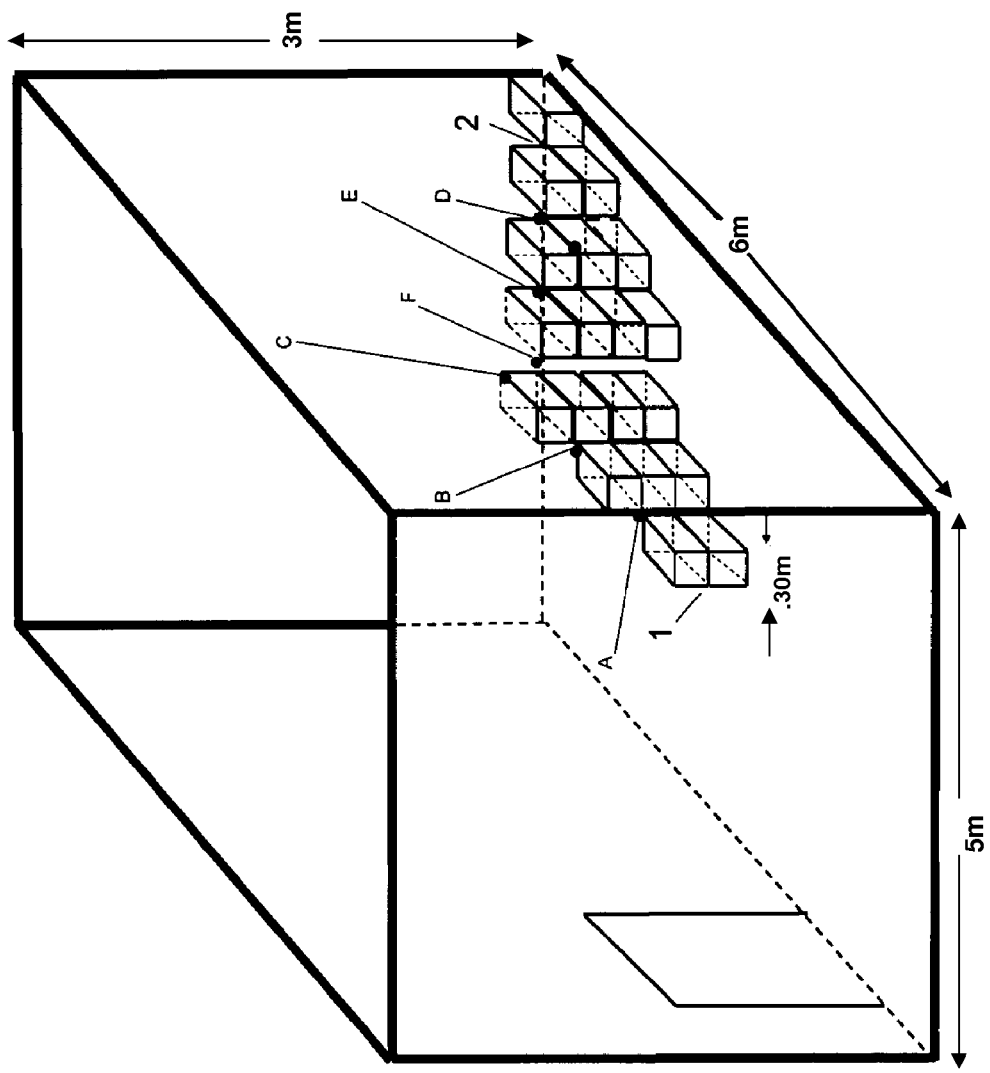
FIG. 5 is a model examining a hydrogen leak in a confined space in accordance with a preferred embodiment of the invention.

The code was written to enable conditional changes to be made to the size of the confined space, the diffusion coefficient, the position of the leak source within the space, and the position by which an ignition source may be present. Therefore, the model conservatively describes multiple scenarios chosen by the user. Since it is necessary to determine the time it would take for a fire hazard to accumulate, the model has been designed to discretely focus on describing a concentration change reaching the lower flammability limit of 4% hydrogen to air. A 4% hydrogen concentration is critical as it is the minimum characteristic H2/Air ratio by which flame propagation is supported. Two point sources where considered as shown in FIG. 5: (1) a source at the center of the confined space; and (2) a source in a corner of the confined space.

These two points were selected for comparisons of (1) where there is no reflection of hydrogen, and (2) where hydrogen reflects off the walls in the corner of the room. Three observation points where considered to represent ignition sources equidistant away from each source point. The results obtained from the simulation may be used for comparison for each source scenario. The dimensions of each source, and observation points are provided below:

Coordinate System:

Point Sources:

Location of 1: 2.5 m × 0.3 m × 3.0 m
Location of 2: 4.7 m × 0.3 m × 5.7 m
Observation Points:

Location of A: 2.8 m × 0.6 m × 3.3 m
Location of B: 3.1 m × 0.9 m × 3.6 m
Location of C: 3.4 m × 1.2 m × 3.9 m
Location of D: 4.4 m × 0.6 m × 5.4 m
Location of E: 4.1 m × 0.9 m × 5.1 m
Location of F: 3.8 m × 1.2 m × 4.8 m Referring to FIG. 5, the leak sources are denoted with * symbol and the observation points are denoted by dots. The confined space represents, for example, a I-car garage with the dimensions of 5.0 m×3.0 m×6.0 m. This scenario was selected as an area wherein a hydrogen source for fueling both home and vehicle fuel cell systems may be found. However, more importantly a garage is an example of a confined space for the basis of the analysis.

Figure 6:
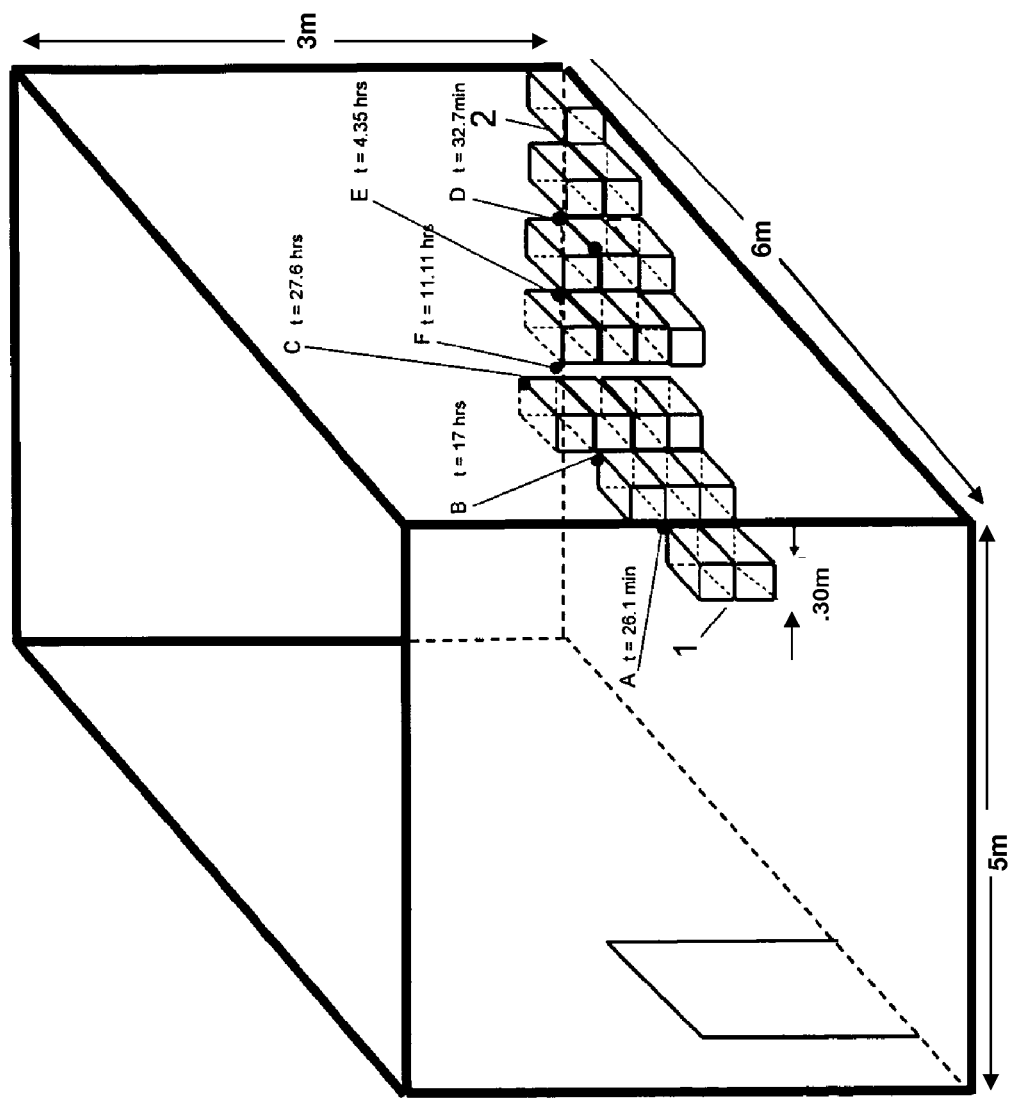
FIG. 6 is a second model examining a hydrogen leak III a confined space III accordance with the preferred embodiment of the invention.

The first leak source was selected to be in the center of the room approximately 1 ft above the floor. The second was placed approximately 1 ft in the x, y, and z directions from the back, right corner of the garage. Both sources were chosen to compare with observation points at equal distances away. All observation points are equidistant from the source and each other by approximately 1 ft (0.30 m) in the x, y, and z planes according to Groups (Group 1, center of garage; Group 2, corner of garage). The model provides the capabilities to choose where the leak source is located as well as where possible ignition sources may accumulate. The model also provides the time at which a 4% concentration of hydrogen/air reaches the ignition point, therefore, further providing an understanding of critical time limits by which the odorant should be detected relative to any position in a confined space. As displayed in FIG. 6 and Table 5, more time is required for the 4% hydrogen concentration to develop as the distance from each source increases.

TABLE 5

Hydrogen Flammability Limit Concentration Data Summary

| Observation Point | Time to Reach H$_2$ Flammabilit (4% H$_2$/Air) | | |
|---|---|---|---|
| | (s) | (min) | (hrs) |
| A | 1566 | 26.1 | 0.44 |
| B | 61288 | 1021.5 | 17.02 |
| C | 99520 | 1658.7 | 27.64 |
| D | 1964 | 32.7 | 0.55 |
| E | 15683 | 261.4 | 4.36 |
| F | 39996 | 666.6 | 11.11 |

Figure 7:
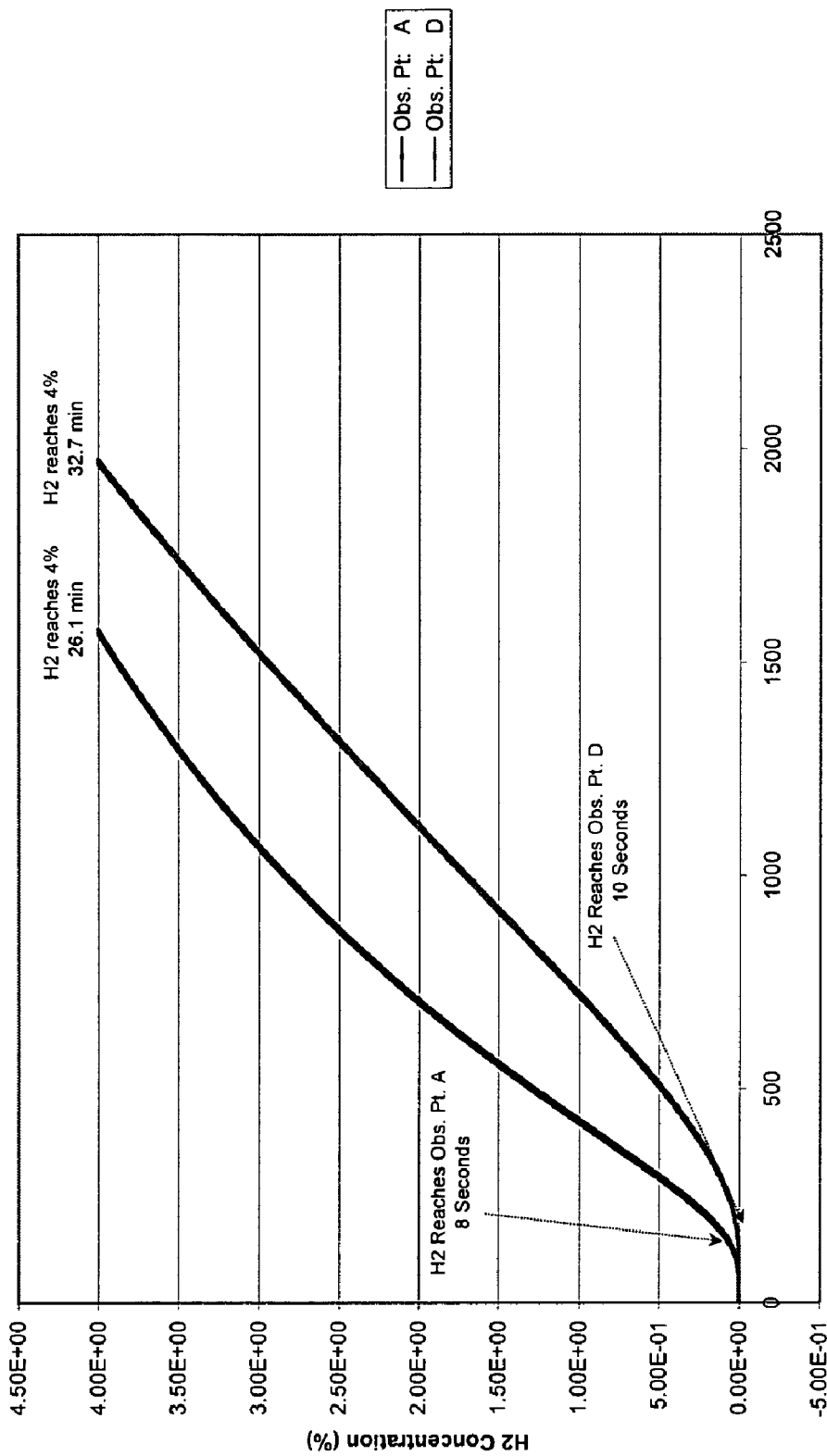
FIG. 7 is a chart of the hydrogen concentration profile as a function of time, as hydrogen approaches the lower flammability limit for observation points A and D (Observation points A and D are referenced from FIGS. 5 and 6)
Figure 8:
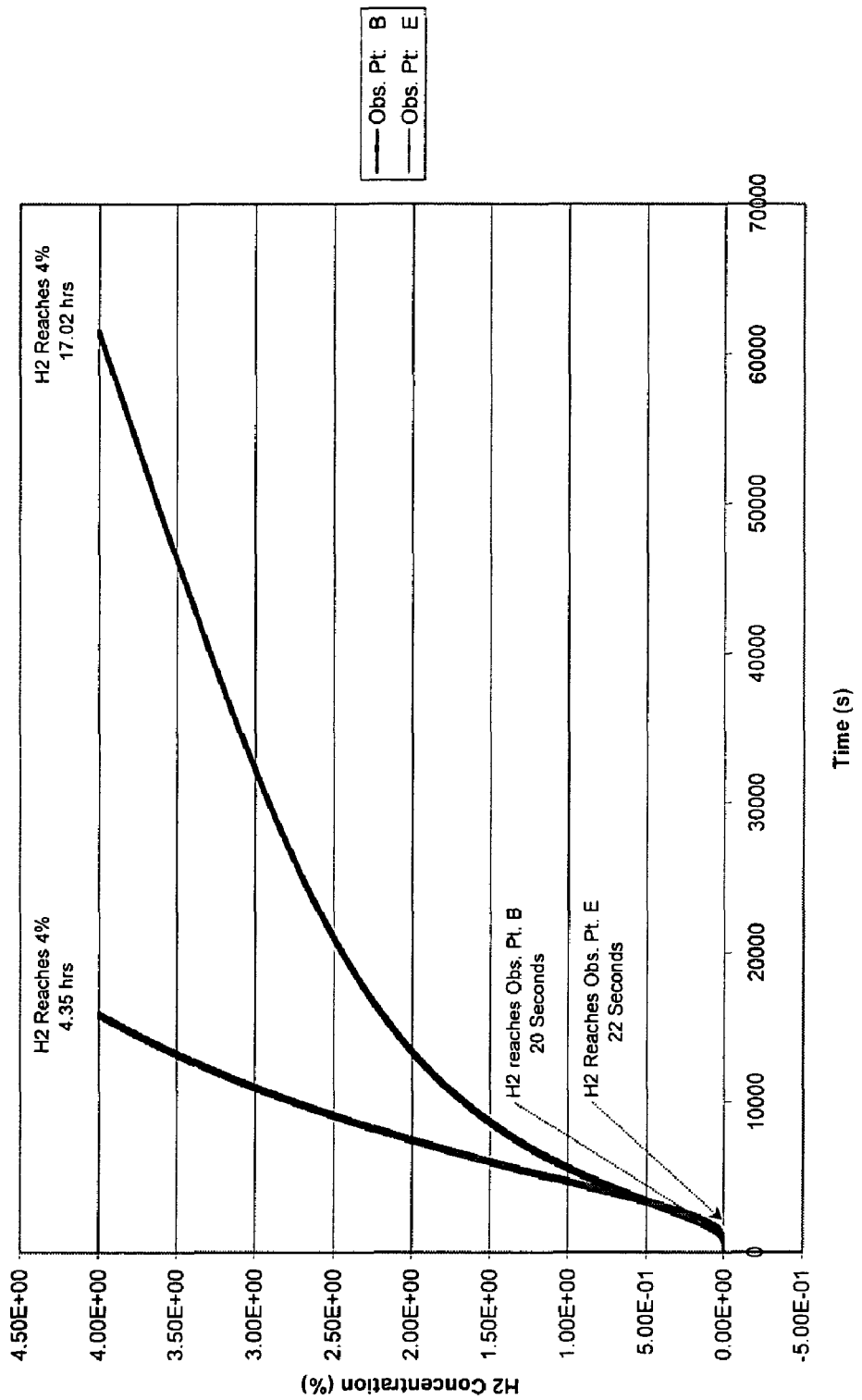
FIG. 8 is a chart of the hydrogen concentration profile as a function of time, as hydrogen approaches the lower flammability limit for observation points B and E (Observation points Band E are referenced from FIGS. 5 and 6)
Figure 9:
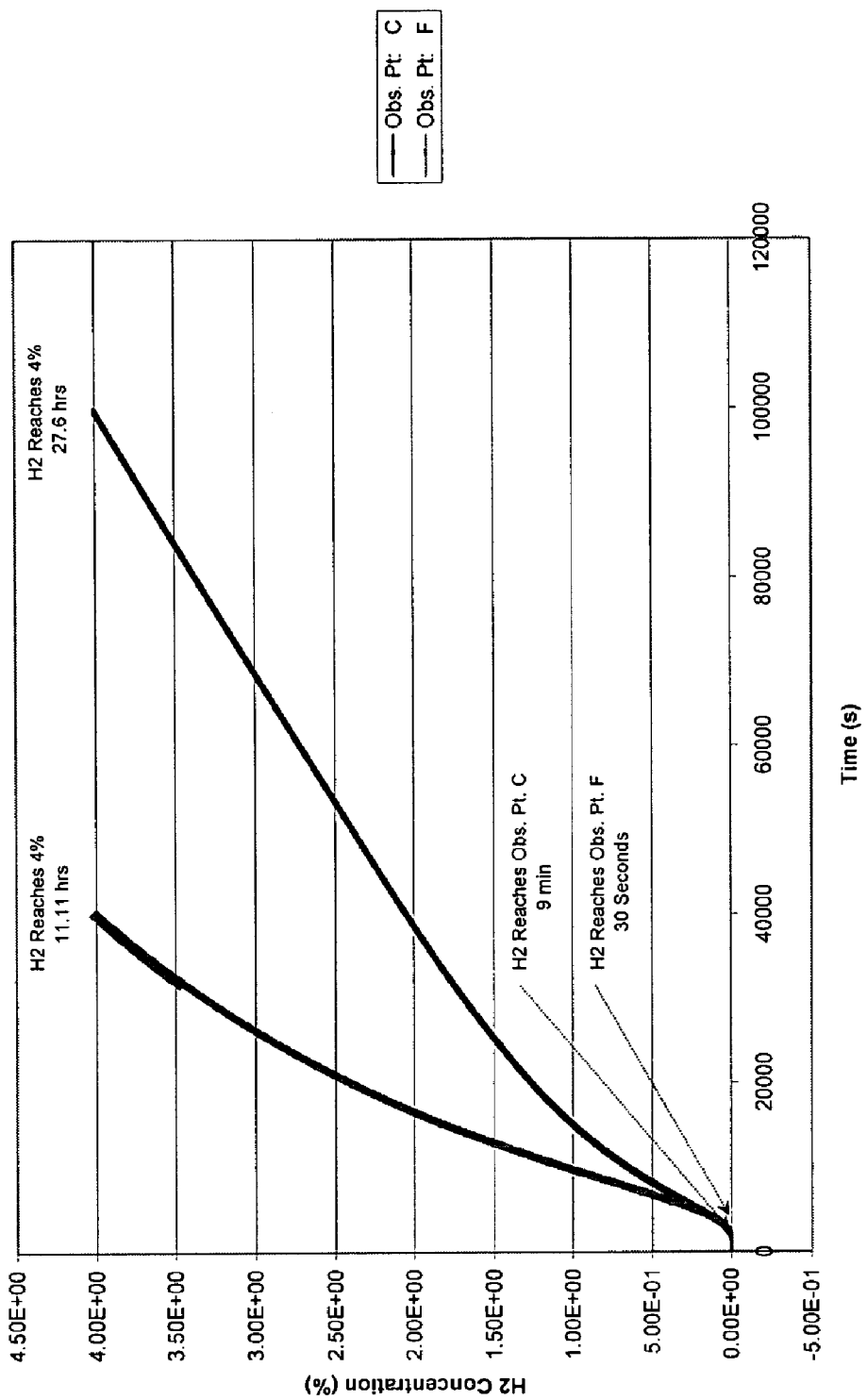
FIG. 9 is a chart of the hydrogen concentration profile as a function of time, as hydrogen approaches the lower flammability limit for observation points C and F (Observation points C and F are referenced from FIGS. 5 and 6)

As explained above, source example (1) and (2) are compared to review the time difference for hydrogen concentration developments to reach the lower flammability limit in the center of the room and in a corner, respectively. In FIGS. 7, 8, and 9, the trend lines are labeled by observation point. Observation point A, B, and C correspond to source scenario (1) for flammability limit concentration development times in the center of the room. Observation point D, E, and F correspond to source scenario (2) for flammability limit concentration development times near the corner of the room FIG. 7 shows a comparison of hydrogen concentration increasing with time for observation points A and D. The concentration profiles for both observation points are almost identical. It must be noted that these times are conservative (transport by molecular diffusion in a stagnant air environment) for comparing odorant detection. Even though it takes twenty minutes to reach a flammable concentration, the hydrogen concentration front reached the observation points in seconds. FIG. 8 shows a comparison of hydrogen concentration increasing with time for observation points B and E. It takes less time for the concentration to reach 4% at E as compared to B, and as a result the concentration profile E is much steeper than profile B. By this time, the wall perpendicular to the x and z-axes become source points due to hydrogen reflection. FIG. 9 shows a similar comparison of how hydrogen concentration increases with time for observation points C and F. FIG. 9 further demonstrates that the flammable concentration times for a leak scenario in a more open space, as opposed to a scenario where reflection occurs, begins to diminish as distance between the observation point and the source increases.

Odorant detectability was analyzed and compared to review how the preliminary odorant selections behave during transport relative to hydrogen. The times by which the odorants reach detectability limits were simulated using the existing three-dimensional transport model.

It is possible to determine the detectability of the odorant based on the loading of the odorant within the tank As an example, a tank may be loaded with 0.1% odorant relative to 99.9% hydrogen. For modeling purposes, 0.1% (1000 ppm) of odorant represents 100% of the source release during a leak. The detectability of ethylselenol (a preferred odorant) is 1.8E-5 ppm based on its olfactory power. Therefore, fractional detectability (Y) for ethylselenol is calculated as follows:

$$\frac{100}{X} \propto \frac{Y}{1.8E-5 \text{ ppm}}$$

Olfactory power is the potency rating given to an odorous compound in air. X is the loading concentration in ppm, and Y is the fractional detectability. Therefore, if X=1000 ppm as described above, fractional detectability (Y) may be solved for where Y is equal to 1.8E-6 ppm. Fractional detectability is a scaling ratio and is unitless. Therefore, fractional detectability may be used in the model to calculate odorant detectability time. This comparison was made to estimate the times by which the odorant becomes detectable at the observation points, shown in FIGS. 3 and 4, and to compare the times by which the odorant concentration profile reaches observation points relative to hydrogen. Diffusion coefficients were predicted for a binary gas system at low pressure by the Boltzmann equation utilizing collision integrals (a) and Lennard-Jones Potentials ($\epsilon$). The collision integrals and the Lennard-Jones Potentials were determined through viscosity data. Table 6 shows the estimated times by which the odorant detectability concentration profile reaches each of the observation points relative to hydrogen.

TABLE 6

Odorant Detectability Data Summary
EthylSelenol Detectability Data Summary

| Loading Conc. (ppm) | Frac. Det. | Observation (A) Det. Time | | | Observation (B) Det. Time | | | Observation (C) Det. Time | | |
|---|---|---|---|---|---|---|---|---|---|---|
| | | (s) | (min) | (hrs) | (s) | (min) | (hrs) | (s) | (min) | (hrs) |
| 1000 | 1.10E−04 | 239.00 | 3.98 | 0.07 | 2834.00 | 47.23 | 0.79 | 6112.00 | 101.87 | 1.70 |
| 100 | 1.10E−03 | 360.00 | 6.03 | 0.10 | 3878.00 | 64.63 | 1.08 | 8316.00 | 138.60 | 2.31 |
| 30 | 3.67E−03 | 569.00 | 7.65 | 0.13 | 4730.00 | 78.83 | 1.31 | 10143.00 | 169.05 | 2.82 |
| 20 | 5.50E−03 | 500.00 | 8.33 | 0.14 | 5093.00 | 84.88 | 1.41 | 10932.00 | 182.20 | 3.04 |
| 10 | 1.10E−02 | 582.00 | 9.70 | 0.16 | 5847.00 | 97.45 | 1.62 | 12583.00 | 209.72 | 3.50 |
| 5 | 2.20E−02 | 686.00 | 11.43 | 0.19 | 6828.00 | 113.80 | 1.90 | 14764.00 | 246.07 | 4.10 |
| 2 | 5.50E−02 | 871.00 | 14.52 | 0.24 | 8685.00 | 144.75 | 2.41 | 18996.00 | 316.60 | 5.28 |
| 0.5 | 2.20E−01 | 1355.00 | 22.58 | 0.38 | 14155.00 | 235.92 | 3.93 | 32288.00 | 538.13 | 8.97 |
| 1000 | 1.80E−06 | 117.50 | 1.96 | 0.03 | 1739.00 | 28.98 | 0.48 | 3833.00 | 63.88 | 1.06 |
| 100 | 1.80E−05 | 168.00 | 2.80 | 0.05 | 2189.00 | 36.48 | 0.61 | 4761.00 | 79.35 | 1.32 |
| 30 | 8.00E−05 | 205.00 | 3.42 | 0.06 | 2505.00 | 41.75 | 0.70 | 5415.00 | 90.25 | 1.50 |
| 20 | 9.00E−05 | 220.00 | 3.67 | 0.06 | 2628.00 | 43.80 | 0.73 | 5671.00 | 94.52 | 1.58 |
| 10 | 1.80E−04 | 247.00 | 4.12 | 0.07 | 2863.00 | 47.72 | 0.80 | 6164.00 | 102.73 | 1.71 |
| 5 | 3.60E−04 | 280.00 | 4.67 | 0.08 | 3137.00 | 52.28 | 0.87 | 6740.00 | 112.33 | 1.87 |
| 2 | 9.00E−04 | 331.00 | 5.52 | 0.09 | 3574.00 | 59.57 | 0.99 | 7666.00 | 127.77 | 2.13 |
| 0.5 | 3.60E−03 | 435.00 | 7.25 | 0.12 | 4478.00 | 74.63 | 1.24 | 9603.00 | 160.05 | 2.67 |
| 1000 | 1.86E−03 | 294.00 | 4.90 | 0.08 | 3080.00 | 51.33 | 0.88 | 6501.00 | 110.02 | 1.83 |
| 100 | 1.86E−02 | 482.00 | 8.03 | 0.13 | 4798.00 | 79.97 | 1.33 | 10359.00 | 172.65 | 2.88 |
| 30 | 6.20E−02 | 659.00 | 10.98 | 0.18 | 6575.00 | 109.58 | 1.83 | 14412.00 | 240.20 | 4.00 |
| 20 | 9.3E−2 | 742.00 | 12.37 | 0.21 | 7470.00 | 124.50 | 2.08 | 16518.00 | 275.30 | 4.59 |
| 10 | 1.86E−01 | 932.00 | 15.53 | 0.26 | 9638.00 | 160.63 | 2.68 | 21813.00 | 363.55 | 6.06 |
| 5 | 3.72E−01 | 1222.00 | 20.37 | 0.34 | 13314.00 | 221.90 | 3.70 | 31409.00 | 523.48 | 8.72 |
| 2 | 9.30E−01 | 1944.00 | 32.40 | 0.54 | 24836.00 | 413.93 | 6.90 | 65536.00 | 1092.27 | 18.20 |
| 0.5 | 3.72E+00 | 6839.00 | 113.98 | 1.90 | 256769.00 | 4279.48 | 71.32 | 442098.00 | 7368.30 | 122.81 |

| Loading Conc. (ppm) | Observation (D) Det. Time | | | Observation (E) Det. Time | | | Observation (F) Det. Time | | |
|---|---|---|---|---|---|---|---|---|---|
| | (s) | (min) | (hrs) | (s) | (min) | (hrs) | (s) | (min) | (hrs) |
| 1000 | 469.00 | 7.82 | 0.13 | 3520.00 | 58.67 | 0.98 | 7105.00 | 118.42 | 1.97 |
| 100 | 678.00 | 11.30 | 0.19 | 4787.00 | 79.78 | 1.33 | 9574.00 | 159.57 | 2.66 |
| 30 | 842.00 | 14.03 | 0.23 | 5806.00 | 96.77 | 1.61 | 11554.00 | 192.57 | 3.21 |
| 20 | 911.00 | 15.18 | 0.25 | 6236.00 | 103.93 | 1.73 | 12388.00 | 206.47 | 3.44 |
| 10 | 1050.00 | 17.50 | 0.29 | 7115.00 | 118.58 | 1.98 | 14091.00 | 234.85 | 3.91 |
| 5 | 1225.00 | 20.42 | 0.34 | 8231.00 | 137.18 | 2.29 | 16254.00 | 270.90 | 4.52 |
| 2 | 1543.00 | 25.72 | 0.43 | 10249.00 | 170.82 | 2.85 | 20185.00 | 336.42 | 5.61 |
| 0.5 | 2385.00 | 39.75 | 0.66 | 15509.00 | 258.48 | 4.31 | 30683.00 | 511.38 | 8.52 |
| 1000 | 252.00 | 4.20 | 0.07 | 2181.00 | 36.35 | 0.61 | 4487.00 | 74.78 | 1.25 |
| 100 | 343.00 | 5.72 | 0.10 | 2731.00 | 45.52 | 0.76 | 5555.00 | 92.58 | 1.54 |
| 30 | 408.00 | 6.80 | 0.11 | 3115.00 | 51.92 | 0.87 | 6304.00 | 105.07 | 1.75 |
| 20 | 433.00 | 7.22 | 0.12 | 3265.00 | 54.42 | 0.91 | 6596.00 | 109.93 | 1.83 |
| 10 | 480.00 | 8.00 | 0.13 | 3552.00 | 59.20 | 0.99 | 7158.00 | 119.27 | 1.99 |
| 5 | 535.00 | 8.92 | 0.15 | 3885.00 | 64.75 | 1.08 | 7804.00 | 130.07 | 2.17 |
| 2 | 622.00 | 10.37 | 0.17 | 4415.00 | 73.58 | 1.23 | 8837.00 | 147.28 | 2.45 |
| 0.5 | 797.00 | 13.28 | 0.22 | 5498.00 | 91.63 | 1.53 | 10941.00 | 182.35 | 3.04 |
| 1000 | 544.00 | 9.07 | 0.15 | 3793.00 | 63.22 | 1.05 | 7570.00 | 126.17 | 2.10 |
| 100 | 862.00 | 14.37 | 0.24 | 5799.00 | 96.65 | 1.61 | 11458.00 | 190.97 | 3.18 |
| 30 | 1166.00 | 19.43 | 0.32 | 7729.00 | 128.82 | 2.15 | 15219.00 | 253.65 | 4.23 |
| 20 | 1310.00 | 21.83 | 0.36 | 8642.00 | 144.03 | 2.40 | 17016.00 | 283.60 | 4.73 |
| 10 | 1641.00 | 27.35 | 0.46 | 10704.00 | 178.40 | 2.97 | 21143.00 | 352.38 | 5.87 |
| 5 | 2144.00 | 35.73 | 0.60 | 13788.00 | 229.80 | 3.83 | 27504.00 | 458.40 | 7.64 |
| 2 | 3339.00 | 55.65 | 0.93 | 21205.00 | 353.42 | 5.89 | 43831.0 | 730.52 | 12.18 |
| 0.5 | 8924.00 | 148.73 | 2.48 | 68859.00 | 1147.65 | 19.13 | 173127.00 | 2885.45 | 48.09 |

The present invention includes an odorant detectability analysis that determines the minimum limits for odorant loading based on dispersion. Minimum odorant loading limits were also established with respect to vapor phase and olfactory relationships. Both criteria should be followed. Currently, codes and standards are under the developmental stages to deliver minimum safety requirements by which manufacturers, distributors, and hydrogen systems will need to comply with. One regulation will require the capability to detect a hydrogen plume at a minimum of 20% of its lower flammability limit (LFL). This is calculated to be 0.82% H2/Air.

The minimum loading concentration of an odorant sufficient to be detected when hydrogen reaches 20% of its lower flammability limit is obtained by plotting odorant detection time (y-axis) versus odorant loading concentration (x-axis). The value where the odorant detectability curve (corresponding to loading concentration) intercepts the time by which hydrogen reaches 20% of its lower flammability limit is the minimum loading concentration sufficient for detection. These values are summarized in Tables 7, 8, and 9, for three sample odorants.

TABLE 7

Ethylselenol 20% LFL and Detectability Intercept Summary

| Observation Point | Odorant Loading Required to Meet 20% LFL $H_2$/Air Intercept Summary (ppm) |
|---|---|
| A | 0.95 |
| B | 0.32 |
| C | 0.22 |
| D | 1.7 |
| E | 2.7 |
| F | 2.5 |

TABLE 8

Ethylmercaptan 20% LFL and Detectability Intercept Summary

| Observation Point | Odorant Loading Required to Meet 20% LFL $H_2$/Air Intercept Summary (ppm) |
|---|---|
| A | 98 |
| B | 38 |
| C | 10.4 |
| D | 110 |
| E | 260 |
| F | 200 |

TABLE 9

Methylamine 20% LFL and Detectability Intercept Summary

| Observation Point | Odorant Loading Required to Meet 20% LFL $H_2$/Air Intercept Summary (ppm) |
|---|---|
| A | 325 |
| B | 130 |
| C | 60 |
| D | 325 |
| E | 575 |
| F | 500 |

In some applications, in may be necessary to remove the odorant in the hydrogen energy system, since, for example, the fuel cell catalyst and storage technologies (metal hydrides, carbon nanotubes, and glass microspheres) generally require ultra-pure hydrogen. In addition, the odorant should be captured before the exhaust of the fuel cell system in order to avoid a false leak warning. Various technologies may be employed to remove the odorant from hydrogen. An important feature of the present invention provides for odorant removal prior to system components that are sensitive to impurities in the hydrogen stream. More specifically, an odorant may be removed through a fixed bed adsorption column just prior to a solid storage unit (metal hydrides, carbon nanotubes, or glass microspheres), or in the case of compressed hydrogen storage, the odorant may be removed just prior to the fuel cell system.

Figure 10:
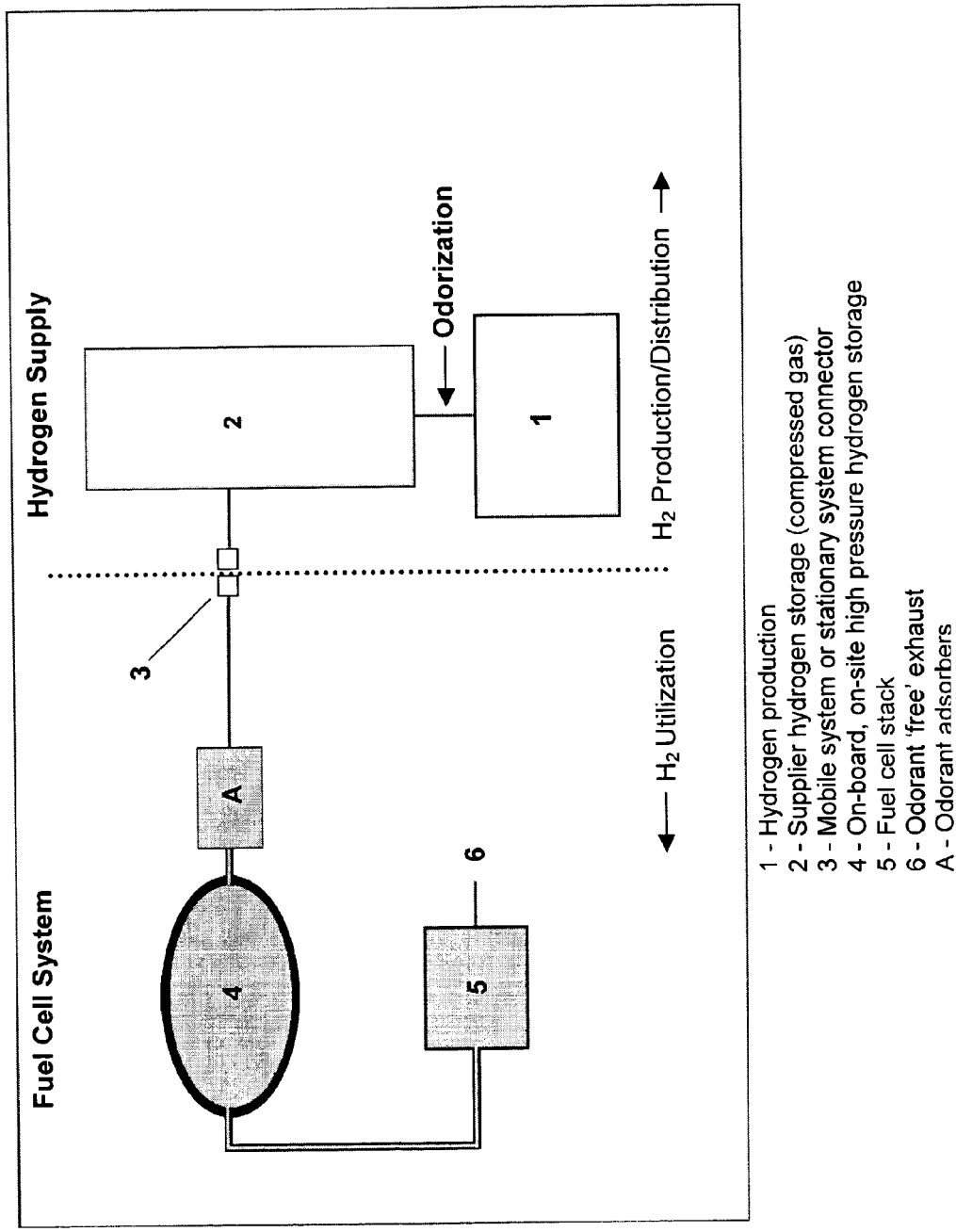
FIG. 10 is a schematic of a system design with odorant adsorbers arranged prior to a solid storage unit.
Figure 11:
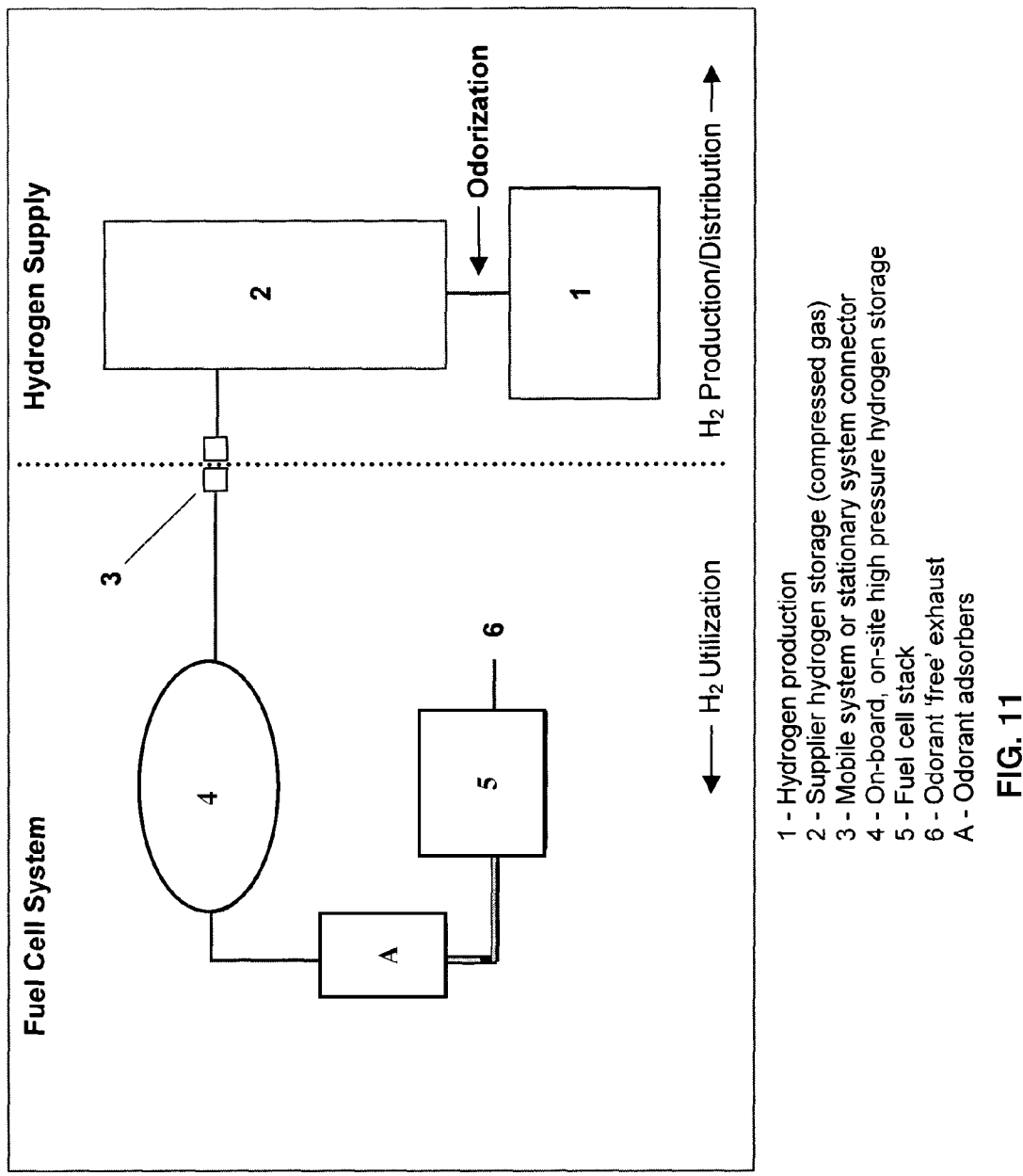
FIG. 11 is a schematic of a system design with odorant adsorbers arranged prior to a fuel cell stack.

Generally, a system design includes hydrogen production, a source of supplied hydrogen (compressed gas), an on-site or on-board hydrogen storage unit, odorant adsorbers, and a fuel cell stack. As seen in FIGS. 10 and 11, the process includes the removal of odorant through adsorbers. In FIG. 10, the odorant adsorbers are placed just prior to the solid storage unit, whereas in FIG. 1I, the adsorbers are placed just prior to the fuel cell stack. In both cases fixed-bed adsorption may be employed to remove the odorant from hydrogen. Although simple physical adsorption may be effective for removal of an odorant, chemical adsorbents may offer superior capacities, and thus may offer a longer lifetime. It is expected than any adsorbent column would need to be replaced periodically.

Figure 12:
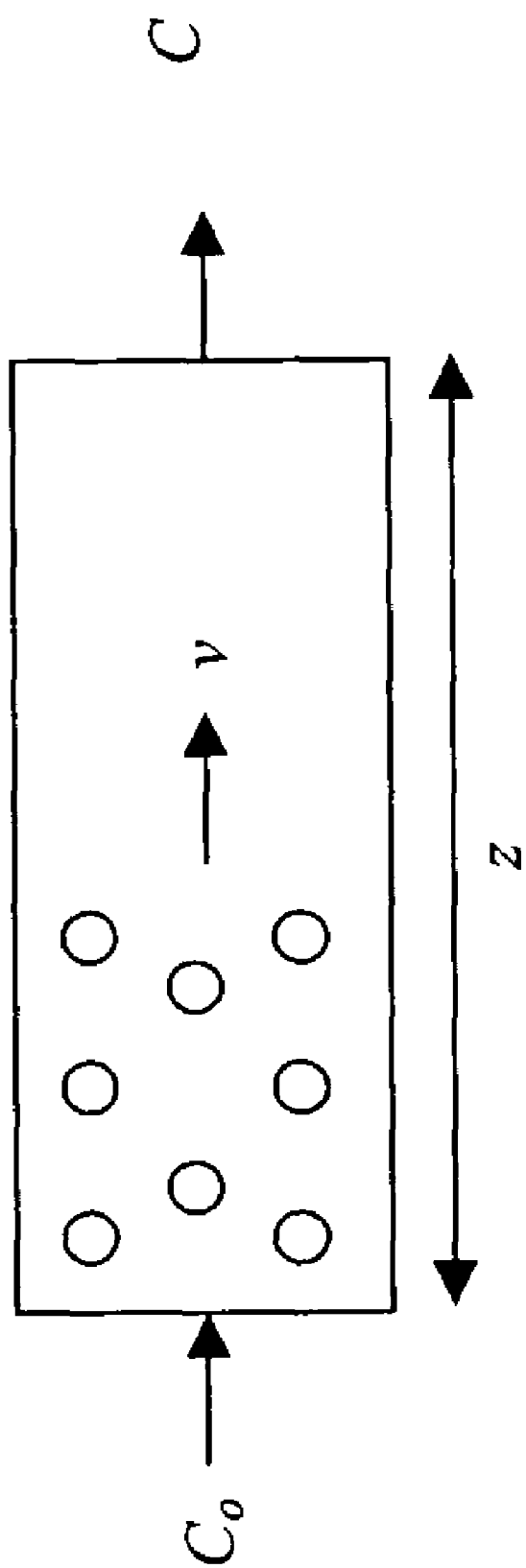
FIG. 12 illustrates a fixed bed flow system.

The Rosen Model, developed by J. B. Rosen in 1952, provides an analytical solution to adsorption kinetics in a linear fixed bed adsorption column. This model is suitable for predicting the adsorption kinetics for removal of trace organic impurities from a gas stream, and the rate of adsorption is governed by two effects: (1) mass transfer of the adsorbate from the bulk gas phase to the surface of spherical particles, and (2) diffusion into the pores of spherical particles. An empirical parameter for equilibrium adsorption capacity is required, based upon Henry's Law. According to Rosen, all other processes affecting the kinetics of the system are very rapid compared to diffusion of the adsorbate either to the surface of the adsorbent particle or within the adsorbent particle itself. Thus, effects (1) and (2) are rate limiting. FIG. 12 shows a simple schematic of the system under consideration. The following variables are considered in Rosen's calculations:

Adjustable Parameters:
K—equilibrium adsorption constant, slope of linear isotherm (Henry's Law)
b—radius of spherical particles, cm
D—effective coefficient of diffusion in spherical particles, $cm^2/s$
k—effective mass transfer coefficient, m/s
Other Nomenclature:
c—concentration of solute in fluid, meq./cc. fluid
$c_o$—constant value of c at column entrance, meq./cc. fluid
q—concentration of solute in solid particles, meq./cc. solid
m—void volume/unit volume solid particles
t—time from start of process, s.
u—$c/c_o$
v—linear flow velocity, cm/s.
x—$3DKz/mvb^2$, bed length parameter, dimensionless
y—$2D(t-z/v)/b^2$ contact time parameter, dimensionless
z—distance from column inlet, cm
v—DK/kb, film resistance parameter, dimensionless Rosen assumes that (1) particles are spherical with uniform radius; (2) constant linear flow velocity—any variations in concentration or flow velocity over a given cross section may be neglected and longitudinal diffusion is assumed to be negligible; (3) mass transfer coefficient and pore diffusion coefficient are independent of position and of concentration; and (4) system has a linear isotherm. Under equilibrium conditions, the concentration of adsorbed material at the solid surface is given by Henry's Law, q=Kc. For the model to be successful and according to this condition, the feed stream must have a low concentration (partial pressure) of adsorbate.

With these assumptions, the solution is linear and may be solved to obtain the governing equation for combined surface film and internal solid diffusion. Rosen's equation:

$$u = 0.5\left[1 + \text{erf}\left(\frac{\frac{3y}{2x} - 1}{2\sqrt{\frac{1+5v}{5x}}}\right)\right]$$

Figure 13:
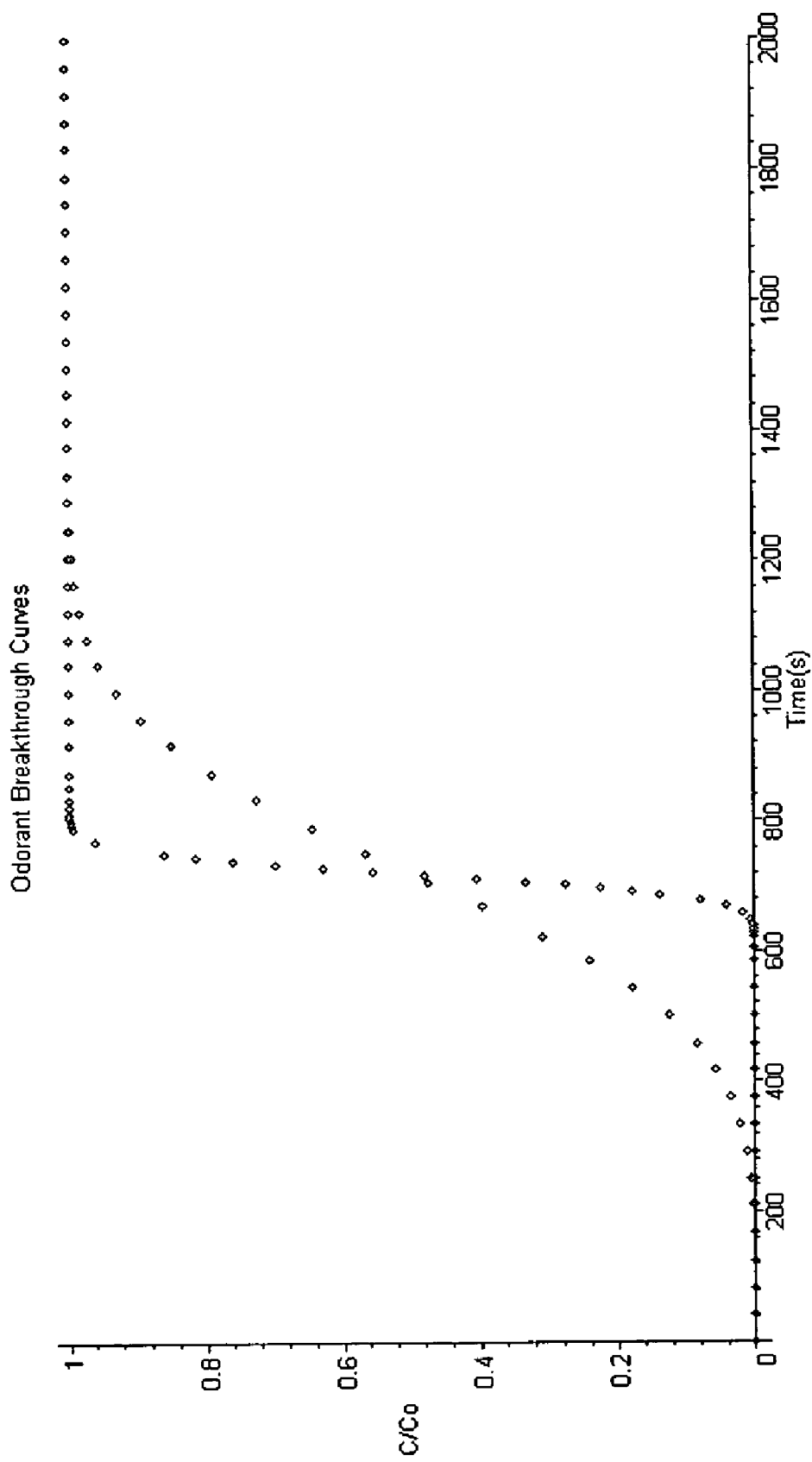
FIG. 13 shows the effect of varying mass transfer coefficients on breakthrough curve shape.
Figure 14:
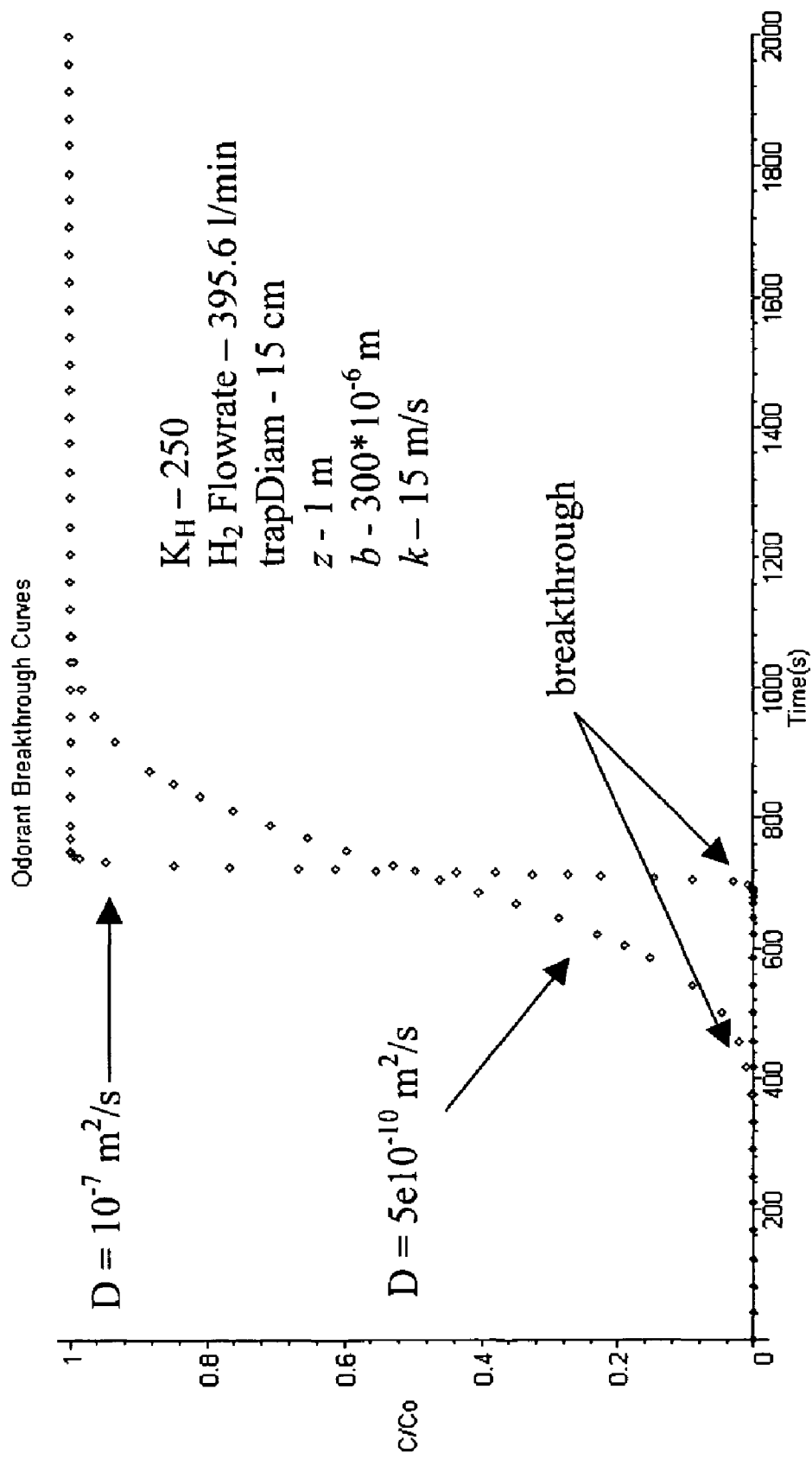
FIG. 14 illustrates the effect of varying effective diffusion coefficients on breakthrough curve shape.
Figure 15:
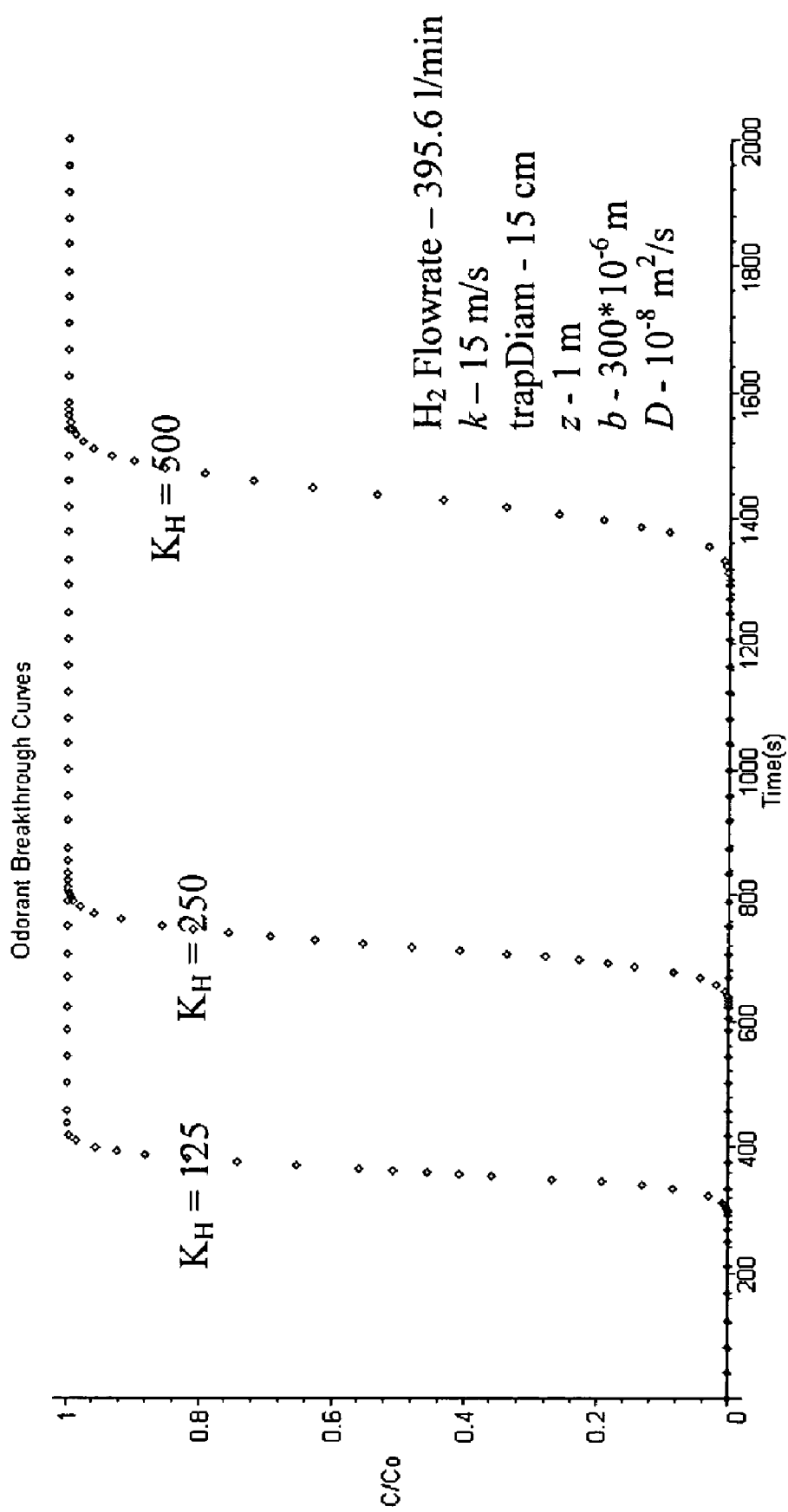
FIG. 15 shows typical adsorption breakthrough curves as predicted by the Rosen equation showing the effect of increasing the Henry's Law constant (equilibrium adsorption capacity of adsorbent)

The Rosen equation was solved and plotted over the appropriate time domain. A plot of u ($c/c_o$) as a function of time yields a breakthrough curve for the set of parameters chosen. The effect of each adjustable parameter must be determined to optimize adsorption for a given adsorption material, bed size, odorant and flow rate. Mass transfer coefficients for adsorbate traveling from the bulk gas stream to the adsorbent surface may be approximated to be 15 m/s for most small organic molecules. Effective diffusivity coefficients may also be approximated based on typical values for molecular Knudsen diffusion of small organic molecules (~$10^{-8}$ m$^2$/s) in pores. With a relatively large mass transfer/large diffusivity terms, the standard breakthrough curve tends toward a step increase in outlet concentration of odorant at breakthrough. When these terms are relatively very small, the breakthrough curve tends toward a sloping "S" shape. The effect of these parameters on breakthrough time is illustrated in FIGS. 13 and 14. The main parameter affecting breakthrough times is the equilibrium adsorption capacity of the adsorbent itself. As an example, if material "A" adsorbs more odorant than material "B" under equilibrium conditions, then material "A" also shows much longer breakthrough times. Equilibrium adsorption capacities are difficult to predict and as a result must be obtained from experiment. The effect of increasing Henry's Law constant on breakthrough times is illustrated in FIG. 15. This analysis quantitatively determines the effects of different parameters governing breakthrough times according to the Rosen model.

The Rosen model provides a solution to a multi-parameter adsorption problem and requires empirical data to obtain breakthrough curves for a particular odorant/adsorbent system. Empirical Henry's law constants are rare for exotic odorous compounds, so a conservative scenario shows that fixed bed adsorption is feasible for removing the odorant. H$^2$S, which has a lower molecular weight and a high vapor pressure. As a result, H$^2$S is less condensable on the adsorbent as compared to odorants of the present invention. Higher molecular weight odorants are expected to have much higher Henry's constants. Therefore, this scenario is conservative in determining adsorbent bed size and breakthrough times.

TABLE 10

Empirically determined Henry's law constants for various adsorbent/adsorbate systems.

| Commercial Adsorbent Type | Adsorbate | Pore Volume (cm$^3$/g) | BET Surface Area (m$^2$/g) | Equilibrium Adsorption Capacity (mg/g) | $K_H$ (dimension-less) |
|---|---|---|---|---|---|
| BAX-1500$^a$ | H$^2$S | 1.214 | 1400 | 295 | 3386 |
| WVA-1100$^a$ | H$^2$S | 1.180 | 1110 | 230 | 2640 |

$^a$manufactured by Westvaco (wood based, H$_3$PO$_4$ activated)

The characteristics of the solid adsorbent (surface area, pore structure, and surface chemistry) are important parameters determining equilibrium adsorption capacities of these materials. Higher surface area materials are capable of adsorbing substantially more odorant as compared to materials with lower surface area.

Figure 16:
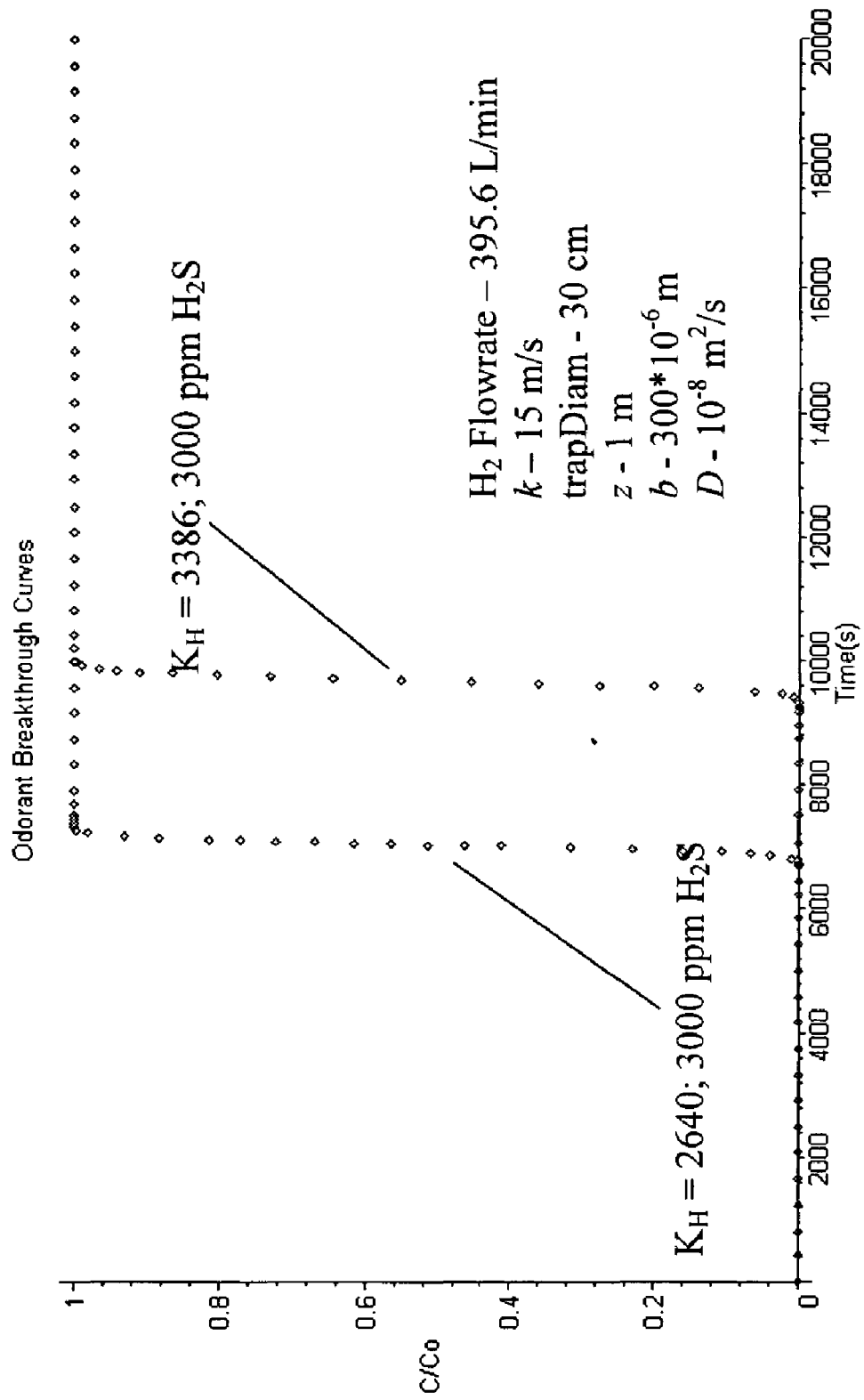
FIG. 16 shows the breakthrough curves based on HzS adsorption over high surface area.

For the lower surface area adsorbent (WVA-1100), adsorption capacity is less and therefore, breakthrough may occur at shorter times. Breakthrough times significantly increase for higher surface area adsorbents. The results for the different activated carbons produced by Westvaco are shown in FIG. 16 for adsorption of H$_2$S. The $K_H$ values reflect the initial concentration of odorant in the gas phase, as well as equilibrium adsorption capacities of the adsorbents. H$_2$S was loaded in hydrogen at 3000 ppm concentration and passed through the bed at a flow rate of 400 L/min, and the adsorbent bed is 1 m in length and 30 cm in diameter, holding 64 kg of activated carbon. Both high surface area carbons give significant breakthrough times. The breakthrough times of 6650 s (110.62 min) and 9250 s (154.3 min) correspond to 7 and 10 tank refills respectively. Given the large flow rates through the bed, these values seem reasonable for an H$_2$S concentration of 3000 ppm. After the adsorbent bed is saturated, it needs to be replaced.

For an odorant with a lower vapor pressure compared to H$_2$S, longer breakthrough times may be expected. In addition, larger molecules may have a greater surface interaction with the carbon surface and may be retained to a greater degree compared to H$_2$S.

Reviewing the selection criteria, as discussed herein, a suitable odorant may be selected. The odorant should have a strong smell, unlike that of mercaptans (thiols) and sulfides that are used to odorize natural gas. The hydrogen odorant should have a unique and unpleasant smell, detectable at less that 1 ppm. Odorant olfactory power and vapor pressure are related to the amount of odorant in the vapor phase at 6000 psi. The odorant should pass the olfactory power-vapor pressure test as describe in detail above. The odorant should possess either sufficient olfactory power or diffusivity in order to be detectable before hydrogen reaches its flammability limits. The odorant should not be hazardous or cause harmful health effects in humans at the levels loaded in hydrogen. A selection matrix may then be created from the above-mentioned criteria. The selection matrix either keeps the odorant as a candidate or rejects it as a possible odorant. The selection matrix is given in FIG. 17. Based on these criteria, preferred odorants are listed in Table 11 below.

TABLE 11

Short-list of Odorants for the Hydrogen Economy

| # | Odorant | Chemical Formula | MW (g/mol) |
|---|---|---|---|
| | | Selenium Compounds | |
| 1 | methyl selenol | CH3SeH | 95.01 |
| 2 | ethyl selenol | C2H5SeH | 109.04 |
| 3 | dimethyl selenide | CH3SeCH3 | 109.04 |
| 4 | isoproyl selenol | C3H7SeH | 123.07 |
| 5 | propyl selenol | C3H7SeH | 123.07 |
| 6 | ethylmethyl selenide | C2H5SeCH3 | 123.07 |
| 7 | isopropylmethy1 selenide | C3H7SeCH3 | 137.10 |
| 8 | tertbutyl selenol | C4H9SeH | 137.10 |
| 9 | diethy1 selenide | C2H5SeC2H5 | 137.10 |
| | | Nitrogen Compounds | |
| 10 | methyl amine | CH3NH2 | 31.06 |
| 11 | ethyl amine | C2H5NH2 | 45.09 |
| 12 | dimethyl amine | (CH3)2NH | 45.09 |
| 13 | propyl amine | C3H7NH2 | 59.12 |
| 14 | ethylmethyl amine | C2H5NH(CH3) | 59.12 |
| 13 | trimethyl amine | (CH3)3N | 59.12 |
| | | Oxygen Compounds | |
| 14 | 2,3-butanedione | C4H6O2 | 86.09 |
| 15 | ethyl acrylate | C5H8O2 | 100.12 |

All documents, patents, journal articles and other materials cited In the present application are hereby incorporated by reference.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claims is:

1. A fuel cell containing a hydrogen composition consisting essentially of: hydrogen; and an odorant selected from the group consisting of oxygen compounds, said odorant having a vapor pressure greater than 0.5 psi and having a smell detectable at less than 1 ppm by a human nose, wherein said oxygen compound is a ketone or an acrylate ester having a minimum olfactory power of 7.0, a minimum diffusivity of 0.01147 $cm^2/s$ and a maximum molecular weight of 200 g/mol.

2. The fuel cell of claim 1, wherein said fuel cell is a vehicle fuel cell.

3. The fuel cell of claim 1, wherein said oxygen compound is ethyl acrylate.

4. The fuel cell of claim 1, wherein said odorant is present in 0.01 to 1000 ppm of said composition.

5. The fuel cell of claim 1, wherein said odorant is present in 0.1 to 40 ppm of said composition.

6. The fuel cell of claim 1, wherein said odorant is not harmful to humans.

7. The fuel cell of claim 1, wherein said odorant is detectable in a vapor phase when said vapor phase exists at a pressure greater than ambient pressure.

8. A fuel cell containing a hydrogen composition comprising: hydrogen; and an odorant selected from the group consisting of oxygen compounds, said odorant having a vapor pressure greater than 0.5 psi and having a smell detectable at less than 1 ppm by a human nose, wherein said oxygen compound is a ketone or an acrylate having a minimum olfactory power of 7.0, a minimum diffusivity of 0.01147 $cm^2/s$ and a maximum molecular weight of 200 g/mol, and wherein said oxygen compound comprises 2,3-butanedione.

9. The fuel cell of claim 7 wherein said odorant further comprises a selenium compound.

10. A fuel cell containing a hydrogen composition comprising: hydrogen; and an odorant selected from the group consisting of oxygen compounds, said odorant having a vapor pressure greater than 0.5 psi and having a smell detectable at less than 1 ppm by a human nose, wherein said oxygen compound is a ketone or an acrylate, having a minimum olfactory power of 7.0, a minimum diffusivity of 0.01147 $cm^2/s$ and a maximum molecular weight of 200 g/mol wherein said odorant further comprises a selenium compound.

11. The fuel cell of claim 10, wherein said fuel cell is a vehicle fuel cell.

* * * * *